(12) United States Patent
Okamura et al.

(10) Patent No.: US 7,553,358 B2
(45) Date of Patent: Jun. 30, 2009

(54) INK JET INK, INK JET RECORDING METHOD, INK CARTRIDGE, RECORDING UNIT AND INK JET RECORDING APPARATUS

(75) Inventors: Daiji Okamura, Yokohama (JP); Jun Yoshizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/107,426

(22) Filed: Apr. 22, 2008

(65) Prior Publication Data

US 2008/0274285 A1 Nov. 6, 2008

(30) Foreign Application Priority Data

May 1, 2007 (JP) .............................. 2007-120482
Apr. 16, 2008 (JP) .............................. 2008-107004

(51) Int. Cl.
*C09D 11/02* (2006.01)
*B41J 2/01* (2006.01)

(52) U.S. Cl. ..................................... 106/31.48; 347/100
(58) Field of Classification Search .............. 106/31.48; 347/100
See application file for complete search history.

(56) References Cited

U.S. PATENT DOCUMENTS

| | | | |
|---|---|---|---|
| 4,202,870 A | 5/1980 | Weber et al. | 423/630 |
| 4,242,271 A | 12/1980 | Weber et al. | 260/448 AD |
| 4,723,129 A | 2/1988 | Endo et al. | 346/1.1 |
| 4,740,796 A | 4/1988 | Endo et al. | 346/1.1 |
| 4,853,037 A | 8/1989 | Johnson et al. | 106/22 |
| 5,091,009 A | 2/1992 | Nogami et al. | 106/287.1 |
| 5,221,497 A | 6/1993 | Watanabe et al. | 252/313.2 |
| 5,431,722 A | 7/1995 | Yamashita et al. | 106/20 R |
| 5,462,590 A | 10/1995 | Yui et al. | 106/20 R |
| 6,867,286 B1* | 3/2005 | Holloway et al. | 534/797 |
| 7,144,452 B2 | 12/2006 | Takayama et al. | 106/31.52 |
| 7,150,783 B2* | 12/2006 | Oshaughnessy et al. | 106/31.48 |
| 7,160,372 B2 | 1/2007 | Yoshizawa et al. | 106/31.47 |

(Continued)

FOREIGN PATENT DOCUMENTS

EP  1 256 608 A2  11/2002

(Continued)

OTHER PUBLICATIONS

Jul. 31, 2008 European Search Report in European Patent Appln. No. 08155327.3.

*Primary Examiner*—Helene Klemanski
(74) *Attorney, Agent, or Firm*—Fitzpatrick, Cella, Harper & Scinto

(57) ABSTRACT

Provided is an ink jet ink having a yellow color including at least two coloring materials of a first coloring material and a second coloring material, the first coloring material being a compound represented by the following general formula (I) and the second coloring material being a coloring material having a pH buffering ability.

General Formula (I)

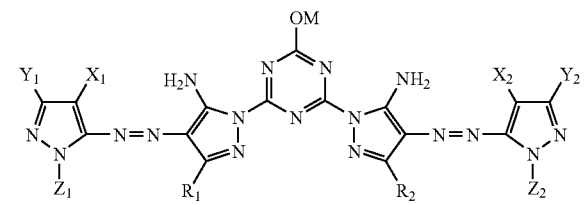

9 Claims, 6 Drawing Sheets

U.S. PATENT DOCUMENTS

| | | | |
|---|---|---|---|
| 7,163,576 B2 * | 1/2007 | Oshaughnessy et al. | 106/31.48 |
| 7,198,664 B2 | 4/2007 | Mafune et al. | 103/31.28 |
| 7,198,665 B2 | 4/2007 | Nakamura et al. | 106/31.52 |
| 7,201,791 B2 | 4/2007 | Okamura et al. | 106/31.47 |
| 7,226,498 B2 | 6/2007 | Yamashita et al. | 106/31.5 |
| 7,241,332 B2 | 7/2007 | Yoshizawa et al. | 106/31.47 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,285,159 B2 | 10/2007 | Aikawa et al. | 106/31.47 |
| 7,294,184 B2 | 11/2007 | Fujimoto et al. | 106/31.47 |
| 7,297,197 B2 | 11/2007 | Jinnou et al. | 106/31.47 |
| 7,465,347 B2 * | 12/2008 | Kitamura et al. | 106/31.48 |
| 7,507,282 B2 * | 3/2009 | Ozawa et al. | 106/31.48 |
| 2005/0115458 A1 | 6/2005 | Oki et al. | 106/31.47 |
| 2006/0005744 A1 * | 1/2006 | Kitayama et al. | 106/31.48 |
| 2006/0016368 A1 | 1/2006 | Ozawa et al. | 106/31.27 |
| 2006/0103705 A1 | 5/2006 | Yoshizawa et al. | 347/100 |
| 2006/0150861 A1 | 7/2006 | Foster et al. | 106/31.48 |
| 2008/0018722 A1 | 1/2008 | Mafune et al. | 347/100 |
| 2008/0145562 A1 * | 6/2008 | Kitamura et al. | 427/466 |
| 2008/0151028 A1 * | 6/2008 | Yamakami et al. | 347/100 |
| 2008/0257209 A1 * | 10/2008 | Kitamura et al. | 106/31.48 |
| 2008/0274283 A1 * | 11/2008 | Tateishi et al. | 427/256 |
| 2009/0000511 A1 * | 1/2009 | Kitamura et al. | 106/31.45 |
| 2009/0047430 A1 * | 2/2009 | Mori et al. | 427/256 |

FOREIGN PATENT DOCUMENTS

| | | |
|---|---|---|
| EP | 1 256 608 A3 | 8/2003 |
| EP | 1 437 388 A1 | 7/2004 |
| JP | 57-44605 B2 | 9/1982 |
| JP | 1-149872 | 6/1989 |
| JP | 1-317115 | 12/1989 |
| JP | 2-258646 | 10/1990 |
| JP | 6-166840 | 6/1994 |
| JP | 6-220386 | 8/1994 |
| JP | 2803134 B2 | 9/1998 |
| JP | 2881847 B2 | 4/1999 |
| WO | WO 2005/090485 A1 | 9/2005 |
| WO | WO 2005/105935 A1 | 11/2005 |
| WO | WO 2006/082669 A1 | 10/2006 |

* cited by examiner

INK JET INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink jet ink, an ink jet recording method, an ink cartridge, a recording unit and an ink jet recording apparatus.

2. Description of the Related Art

An ink jet recording method is a method of forming images by applying ink droplets to recording media such as plain paper and glossy media. This method has rapidly come into widespread use by the reduction in cost and improvement in recording speed of ink jet recording apparatuses. Further, with the rapid spread of digital cameras in addition to the progress in obtaining high-quality images by the ink jet recording method, the ink jet recording method has been commonly used as the output method of images equal to silver halide photographs.

In recent years, further progress in obtaining high-quality images is achieved by minimization of ink droplets and improvement in the color gamut accompanying introduction of a multicolor ink. On the other hand, the demand to a coloring material and ink becomes higher, wherein severer properties are demanded in the improvement in color developabilities and reliability of clogging and ejection stability.

On the other hand, it is mentioned that the ink jet recording method is inferior in the image storage stability of the obtained recorded matter, as a problem of the ink jet recording method. Generally, the image storage stability of the recorded matter obtained by the ink jet recording method is low as compared with silver halide photographs. When a recorded matter is specifically exposed to light, humidity, heat, the environmental gas that is present in the air, etc. for a long time, there is a problem that the coloring material on the recorded matter deteriorates and is easy to generate the change of color tone and fading of images.

Among image storage stabilities, an especially large number of proposals have been made to improve the lightfastness of an image. Among cyan, magenta and yellow inks, yellow ink has especially low lightfastness of an image. A coloring material has been proposed which can, for example, improve lightfastness of an image, and form images having excellent color developabilities (see WO 2006/082669).

On the other hand, there have been proposals concerning inks which contain a material (buffer agent etc.) having a pH buffering effect in order to suppress the effects of a change in pH of the ink (deposition of the coloring material, corrosion of parts in contact with the ink etc.) (See Japanese Patent Application Laid-Open Nos. H01-149872, H06-166840 and H06-220386).

Among yellow, magenta and cyan inks, which are widely used for ink jet ink, yellow ink tends to have especially poor lightfastness of an image. Therefore, the present inventors thought that there was a need for detailed investigation into the coloring materials used in yellow ink.

SUMMARY OF THE INVENTION

Therefore, an object of the present invention is to provide an ink jet ink having a yellow color which gives an image excellent in lightfastness, color developabilities and color tone, and which is also excellent in ink storage stability. Another object of the present invention is to provide an ink jet recording method, an ink cartridge, a recording unit and an ink jet recording apparatus, all using the above ink jet ink.

The above objects are achieved by the following present invention. Specifically, the ink jet ink according to the present invention comprises at least two coloring materials of a first coloring material and a second coloring material, the first coloring material being a compound represented by the following general formula (I) and the second coloring material being a coloring material having a pH buffering ability.

General Formula (I)

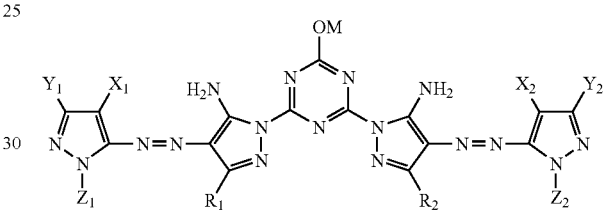

(wherein $R_1$, $R_2$, $Y_1$ and $Y_2$ each independently represent a monovalent group; $X_1$ and $X_2$ each independently represent an electron withdrawing group having a Hammett's σp value of 0.20 or more; $Z_1$ and $Z_2$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocycle group; and M represents a hydrogen atom, an alkali metal, ammonium or organic ammonium).

Further, the ink jet ink according to another embodiment of the present invention is such that in the ink jet ink of the above-described structure, the second coloring material is a compound represented by the following general formula (III):

General Formula (III)

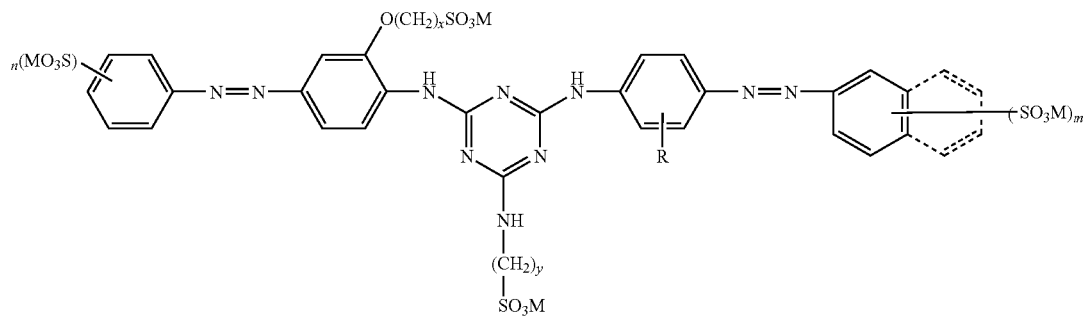

[The above 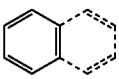 is 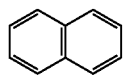 or ]

(wherein R represents a hydrogen atom, an alkyl group having 1 to 4 carbon atoms, an alkoxy group having 1 to 4 carbon atoms or a sulfonic acid group; n is an integer of 1 or 2; m is an integer of 1 to 3; x is an integer of 2 to 4; y is an integer of 1 to 3; and each M independently represents a hydrogen atom, an alkali metal, ammonium or organic ammonium).

Further, an ink jet recording method according to another embodiment of the present invention is an ink jet recording method in which ink is ejected by an ink jet system to perform recording on a recording medium by ejecting ink by an ink jet system, wherein the ink is an ink jet ink of the above constitution.

Further, an ink cartridge according to another embodiment of the present invention is an ink cartridge provided with an ink storage portion for storing ink, wherein the ink is an ink jet ink of the above constitution.

Further, a recording unit according to another embodiment of the present invention is a recording unit provided with an ink storage portion for storing ink and a recording head for ejecting ink, wherein the ink is an ink jet ink of the above constitution.

Further, an ink jet recording apparatus according to another embodiment of the present invention is an ink jet recording apparatus provided with an ink storage portion for storing ink and a recording head for ejecting ink, wherein the ink is an ink jet ink of the above constitution.

The present invention can provide an ink jet ink having a yellow color which gives an image excellent in lightfastness, color developabilities and color tone, and which has excellent storage stability. Another embodiment of the present invention can provide an ink jet recording method, an ink cartridge, a recording unit and an ink jet recording apparatus, all using the above ink jet ink.

Further features of the present invention will become apparent from the following description of exemplary embodiments with reference to the attached drawings.

DESCRIPTION OF THE EMBODIMENTS

Figure 1:
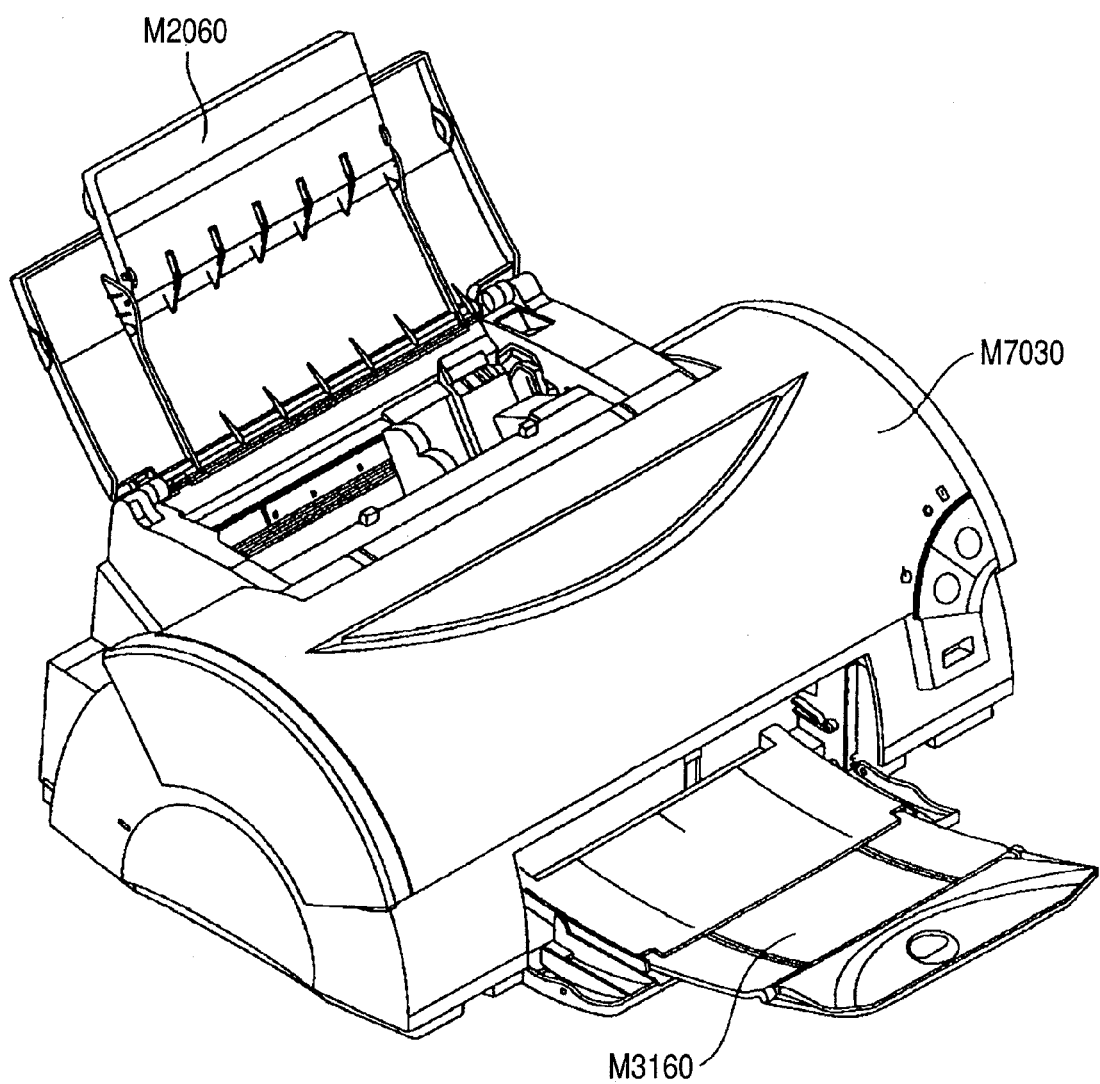
FIG. 1 is a perspective view of an ink jet recording apparatus.

Preferred embodiments of the present invention are listed below and described in detail.

Note that, when a compound is a salt, the salt dissociates to and is present as ions in ink, but, for convenience, this state is described as "the ink contains a salt" in the present invention. Further, a compound represented by the general formula (I) and a compound represented by the general formula (II) may be abbreviated to "a compound of the general formula (I)" and "a compound of the general formula (II)", respectively. In addition, a compound represented by the general formula (III) and a compound represented by the general formula (IV) may be abbreviated to "a compound of the general formula (III)" and "a compound of the general formula (IV)", respectively.

As described above, among yellow, magenta and cyan inks, which are widely used for ink jet ink, yellow ink tends to have especially poor lightfastness of an image. Therefore, the present inventors have carried out various investigations into the coloring materials used in yellow ink. As a result, the present inventors have noticed that a compound of the general formula (I) described in the above-described WO 2006/082669, and among those compounds, especially a compound of the general formula (II) has excellent lightfastness and color developabilities.

General Formula (I)

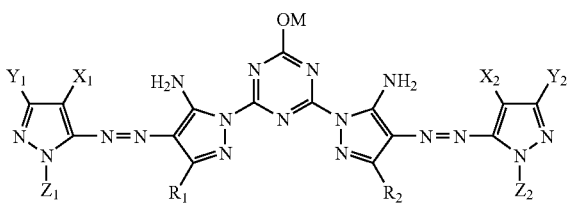

(wherein $R_1$, $R_2$, $Y_1$ and $Y_2$ each independently represent a monovalent group; $X_1$ and $X_2$ each independently represent an electron withdrawing group having a Hammett's σp value of 0.20 or more; $Z_1$ and $Z_2$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocycle group; and M represents a hydrogen atom, an alkali metal, ammonium or organic ammonium.)

General Formula (II)

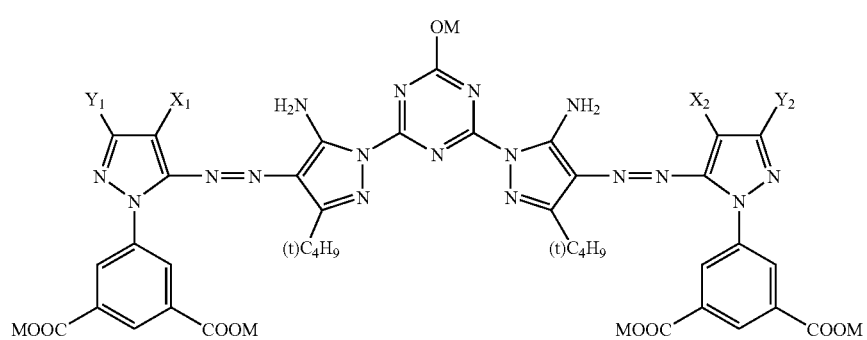

(wherein $Y_1$ and $Y_2$ each independently represent a monovalent group; $X_1$ and $X_2$ each independently represent an electron withdrawing group having a Hammett's σp value of 0.20 or more; and each M independently represents a hydrogen atom, an alkali metal, ammonium or organic ammonium)

However, when the present inventors have prepared ink containing only a compound of the general formula (I) or a compound of the general formula (II) as the coloring material for investigation of various images and investigation of reliability, they have learned that there are two problems.

The first problem is the following problem with color tone and color gamut of an image. The color tone of an image formed using only ink containing a compound of the general formula (I) or a compound of the general formula (II) as the coloring material has a green tinge. Moreover, the color gamut of an image formed using the above-described ink together with cyan ink and magenta ink which contain various hue angles, especially the color gamut in the red region, is greatly lost.

The second problem is the following problem with storage stability of the ink. First, ink containing only a compound of the general formula (I) or a compound of the general formula (II) as a coloring material was prepared, and investigation was carried out using this ink. Specifically, the prepared ink was loaded into several ink jet recording apparatuses, and then the ink jet recording apparatuses were left for a long duration. After that, when the recovery properties were investigated, a number of ejection defects were found to have occurred in the ink jet recording apparatuses. Observation of the nozzle of the recording head where the ejection defects occurred showed that coloring material had deposited in the nozzle vicinity.

As a result of investigations into these phenomena by the present inventors, it was learned that a compound of the general formula (I) or a compound of the general formula (II) has a decreased solubility over the region where the ink pH is from neutral to acidic, and that especially in the acidic region, the coloring material deposits. Specifically, in the region where pH is less than 7.0, an increase in ink viscosity and deposition of the coloring material due to the decrease in solubility were seen. Further, if an ink containing only either of the above-described compounds as the coloring material is left for a long duration, it can be considered that the following phenomena will occur. Specifically, the pH of the above-described ink changes as a result of elution of the components from the ink and parts in contact with the water-soluble organic solvent in the ink. Further, when capping the ejection orifice with a cap which constitutes the recovery system of an ink jet recording apparatus, volatile components which have evaporated from a different ink ejection orifice which is capped with the same cap are incorporated from the above-described ink ejection orifice, whereby the above-described ink pH changes. In addition, as a result of activating a wiper which constitutes the above-described recovery system, a different ink is incorporated from the above-described ink ejection orifice, whereby the above-described ink pH changes. Still further, while the ink jet recording apparatus is left for a long duration, the above-described ink pH changes due to oxidation of the water-soluble organic solvent in the ink. As a result of at least one of these phenomena, or as a result of some other factor, it is thought that the pH of an ink containing only a compound of the general formula (I) or a compound of the general formula (II) as the coloring material changes, whereby the increase in ink viscosity and deposition of the coloring material occur.

It was thought that the increase in ink viscosity and deposition of the coloring material resulting from such a change in the pH of the ink could be suppressed by adding a buffer agent such as a sodium borate and an amine compound described in, for example, the above-described Japanese Patent Application Laid-Open Nos. H01-149872, H06-166840 and H06-220386. However, according to investigations carried out by the present inventors, if recording was continuously carried out with such an ink, it was learned that reliability might not be obtained, such as not being able to obtain sufficient ejection stability, and not being able to obtain sufficient ink storability due to interaction between the buffer agent and impurities in the ink.

Accordingly, the present inventors have arrived at the present invention as a result of carrying out extensive investigations to obtain the knowledge that the problems held by conventional inks could be improved upon by using not the buffer agent but a specific coloring material as a compound capable of improving color tone and suppressing change in pH. Specifically, the above-described problems can be resolved by making the ink jet ink have a compound represented by the following general formula (I) as a first coloring material, which is used together with a second coloring material having a pH buffering ability. Further, although the excellent lightfastness and color developabilities which are achievable when a compound of the general formula (I) or a compound of the general formula (II) is used as the coloring material are obtained, these coloring materials have problems with color tone and ink storage stability. The present inventors have carried out further investigations to solve these problems. Especially, the present inventors have sought a coloring material combining the following three characteristics which are necessary to achieve this. Specifically, the present inventors have sought: (1) a coloring material capable of toning to a desirable yellow by mixing with a compound of the general formula (I) or a compound of the general formula (II); (2) a coloring material excellent in lightfastness and color developabilities; and (3) a coloring material having a pH buffering ability. As a result, the present inventors have discovered that a compound of the general formula (III), and among them, especially a compound of the general formula (IV), is preferred. It is noted that the term "pH buffering ability" in the present invention means that pH does not rise above a certain hydrogen ion concentration even if a certain level of acid is added. The coloring material having a pH buffering ability is described later.

use as the first coloring material a compound represented by the above-described general formula (I), and among them, a compound of the above-described general formula (II), and to use as the second coloring material a compound of the above-described general formula (III), and among them, a compound of the above-described general formula (IV). In this manner, by using a combination of compounds having a specific structure for the coloring materials used in the ink, the effects of the present invention can be especially markedly obtained. The ink jet ink of the present invention will now be described in more detail.

General Formula (III)

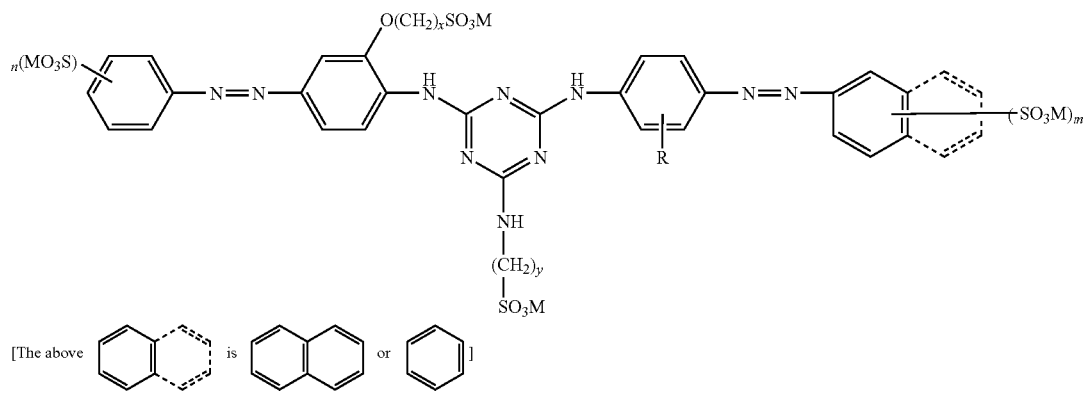

(wherein R represents a hydrogen atom, an alkyl group having 1 to 4 carbon atoms, an alkoxy group having 1 to 4 carbon atoms or a sulfonic acid group; n is an integer of 1 or 2; m is an integer of 1 to 3; x is an integer of 2 to 4; and y is an integer of 1 to 3; and each M independently represents a hydrogen atom, an alkali metal, ammonium or organic ammonium.)

<Ink>

The components constituting the ink jet ink (hereinafter, may sometimes be referred to simply as "ink") and the characteristics of the ink of the present invention will be described in detail below.

General Formula (IV)

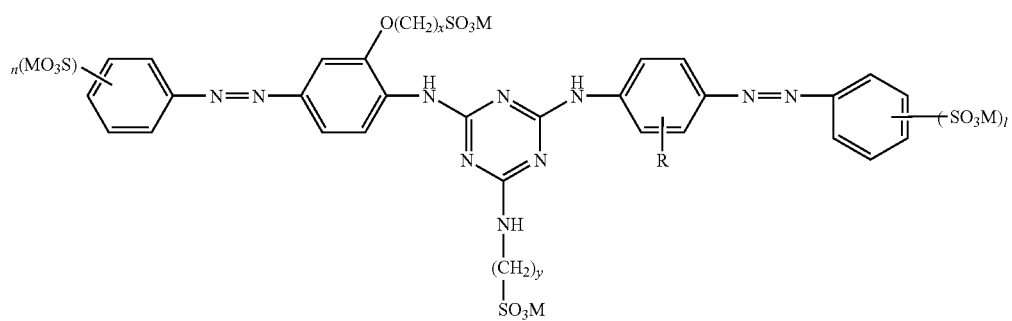

(wherein R represents a hydrogen atom, an alkyl group having 1 to 4 carbon atoms, an alkoxy group having 1 to 4 carbon atoms or a sulfonic acid group; n is an integer of 1 or 2; l is an integer of 1 or 2; x is an integer of 2 to 4; and y is an integer of 1 to 3; and each M independently represents a hydrogen atom, an alkali metal, ammonium or organic ammonium.)

As has been described above, a feature of the present invention is making the ink jet ink have a compound represented by the above-described general formula (I) as a first coloring material, which is used together with a second coloring material having a pH buffering ability. It is especially preferred to (Coloring Material)

[First coloring material: A compound represented by the general formula (I) and a compound represented by the general formula (II)]

The ink of the present invention needs to contain a compound of the following general formula (I) having the features of excellent lightfastness and color developabilities as a first coloring material. Even among the compounds of the following general formula (I), it is particularly preferred to use a compound of the general formula (II) as the first coloring material. Hereinafter, these general formulas will be described.

General Formula (I)

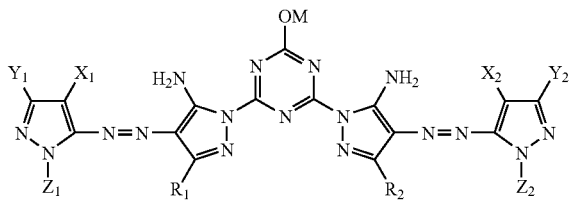

(wherein $R_1$, $R_2$, $Y_1$ and $Y_2$ each independently represent a monovalent group; $X_1$ and $X_2$ each independently represent an electron withdrawing group having a Hammett's σp value of 0.20 or more; $Z_1$ and $Z_2$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocycle group; and M represents a hydrogen atom, an alkali metal, ammonium or organic ammonium)

General Formula (II)

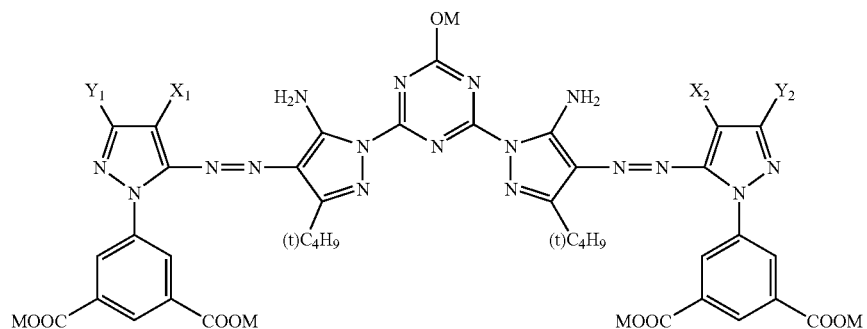

(wherein $Y_1$ and $Y_2$ each independently represent a monovalent group; $X_1$ and $X_2$ each independently represent an electron withdrawing group having a Hammett's σp value of 0.20 or more; and each M independently represents a hydrogen atom, an alkali metal, ammonium or organic ammonium)

$R_1$, $R_2$, $Y_1$ and $Y_2$ in the general formula (I) and $Y_1$ and $Y_2$ in the general formula (II) each independently represent a monovalent group. Specifically, each may represent the following substituents: a hydrogen atom, a halogen atom, an alkyl group, a cycloalkyl group, an aralkyl group, an alkenyl group, an alkynyl group, an aryl group, a heterocycle group, a cyano group, a hydroxyl group, a nitro group, an alkoxy group, an aryloxy group, a silyloxy group, a heterocyclicoxy group, an acyloxy group, a carbamoyloxy group, an alkoxycarbonyloxy group, an aryloxycarbonyloxy group, an amino group (alkyl amino group, aryl amino group), an acyl amino group (amido group), an aminocarbonyl amino group (ureido group), an alkoxycarbonyl amino group, an aryloxycarbonyl amino group, a sulfamoyl amino group, an alkylsulfonyl amino group, an arylsulfonyl amino group, an alkylthio group, an arylthio group, a heterocyclicthio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphinyl group, a phosphinyloxy group, a phosphinyl amino group, a silyl group, an azo group, an imido group and the like. These groups may also have a further substituent.

Among the above-described examples, especially preferred are a hydrogen atom, a halogen atom, an alkyl group, an aryl group, a heterocycle group, a cyano group, an alkoxy group, an amido group, a ureido group, an alkylsulfonyl amino group, an arylsulfonyl amino group, a sulfamoyl group, an alkylsulfonyl group, an arylsulfonyl group, a carbamoyl group and an alkoxycarbonyl amino group; even more preferred are a hydrogen atom, a halogen atom, an alkyl group, an aryl group, a cyano group, an alkylsulfonyl group, an arylsulfonyl group and a heterocycle group; and still even more preferred are a hydrogen atom, an alkyl group, an aryl group, a cyano group and an alkylsulfonyl group. In the present invention, $Y_1$ and $Y_2$ in the general formula (II) each particularly preferably represent independently a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group or a substituted or unsubstituted heterocycle group.

Hereinafter, $R_1$, $R_2$, $Y_1$ and $Y_2$ in the general formula (I) and the general formula (II) will be described in more detail.

As the halogen atom, a chlorine atom, a bromine atom and an iodine atom can be mentioned. Among them, a chlorine atom or a bromine atom is preferred, and a chlorine atom is particularly preferred.

As the alkyl group, a substituted or unsubstituted alkyl group having 1 to 30 carbon atoms can be mentioned. Specific examples include methyl, ethyl, butyl, t-butyl, n-octyl, eicosyl, 2-chloroethyl, hydroxyethyl, cyanoethyl and 4-sulfobutyl.

As the cycloalkyl group, a substituted or unsubstituted cycloalkyl group having 5 to 30 carbon atoms can be mentioned. Specific examples include cyclohexyl, cyclopentyl and 4-n-dodecylcyclohexyl.

As the aralkyl group, a substituted or unsubstituted aralkyl group having 7 to 30 carbon atoms can be mentioned. Specific examples include benzyl and 2-phenethyl.

As the alkenyl group, a substituted or unsubstituted alkenyl group having 2 to 30 carbon atoms can be mentioned. Specific examples include vinyl, allyl, prenyl, geranyl, oleyl, 2-cyclopentene-1-yl and 2-cyclohexene-1-yl.

As the alkynyl group, a substituted or unsubstituted alkynyl group having 2 to 30 carbon atoms can be mentioned. Specific examples include ethynyl and propargyl.

As the aryl group, a substituted or unsubstituted aryl group having 6 to 30 carbon atoms can be mentioned. Specific examples include phenyl, p-tolyl, naphthyl, m-chlorophenyl and o-hexadecanoylaminophenyl.

The heterocyclic group is a monovalent group derived by removing one hydrogen atom from a substituted or unsubstituted, aromatic or non-aromatic 5- or 6-membered heterocyclic compound, which may be further ring-condensed. Among them, the heterocyclic group is preferably a 5- or 6-membered aromatic heterocyclic group having 3 to 50 carbon atoms. Examples of the heterocyclic group include, without limiting the substitution position, pyridine, pyrazine, pyridazine, pyrimidine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

As the alkoxy group, a substituted or unsubstituted alkoxy group having 1 to 30 carbon atoms can be mentioned. Specific examples include methoxy, ethoxy, isopropoxy, n-octyloxy, methoxyethoxy, hydroxyethoxy and 3-carboxypropoxy.

As the aryloxy group, a substituted or unsubstituted aryloxy group having 6 to 30 carbon atoms can be mentioned. Specific examples include phenoxy, 2-methylphenoxy, 4-t-butylphenoxy, 3-nitrophenoxy and 2-tetradecanoylaminophenoxy.

As the silyloxy group, a silyloxy group having 3 to 20 carbon atoms can be mentioned. Specific examples include trimethylsilyloxy and t-butyldimethylsilyloxy.

As the heterocyclicoxy group, a substituted or unsubstituted heterocyclicoxy group having 2 to 30 carbon atoms can be mentioned. Specific examples include 1-phenyltetrazol-5-oxy and 2-tetrahydropyranyloxy.

As the acyloxy group, a formyloxy group, a substituted or unsubstituted alkylcarbonyloxy group having 2 to 30 carbon atoms and a substituted or unsubstituted arylcarbonyloxy group having 6 to 30 carbon atoms can be mentioned. Specific examples include formyloxy, acetyloxy, pivaloyloxy, stearoyloxy, benzoyloxy and p-methoxyphenylcarbonyloxy.

As the carbamoyloxy group, a substituted or unsubstituted carbamoyloxy group having 1 to 30 carbon atoms can be mentioned. Specific examples include N,N-dimethylcarbamoyloxy, N,N-diethylcarbamoyloxy, morpholinocarbonyloxy, N,N-di-n-octylaminocarbonyloxy and N-n-octylcarbamoyloxy.

As the alkoxycarbonyloxy group, a substituted or unsubstituted alkoxycarbonyloxy group having 2 to 30 carbon atoms can be mentioned. Specific examples include methoxycarbonyloxy, ethoxycarbonyloxy, t-butoxycarbonyloxy and n-octylcarbonyloxy.

As the aryloxycarbonyloxy group, a substituted or unsubstituted aryloxycarbonytoxy group having 7 to 30 carbon atoms can be mentioned. Specific examples include phenoxycarbonyloxy, p-methoxyphenoxycarbonyloxy and p-n-hexadecyloxyphenoxycarbonyloxy.

As the amino group, a substituted or unsubstituted alkylamino group having 1 to 30 carbon atoms and a substituted or unsubstituted arylamino group having 6 to 30 carbon atoms can be mentioned. Specific examples include amino, methylamino, dimethylamino, anilino, N-methylanilino, diphenylamino, hydroxyethylamino, carboxyethylamino, sulfoethylamino and 3,5-dicarboxyanilino.

As the acylamino group, a formylamino group, a substituted or unsubstituted alkylcarbonylamino group having 1 to 30 carbon atoms and a substituted or unsubstituted arylcarbonylamino group having 6 to 30 carbon atoms can be mentioned. Specific examples include formylamino, acetylamino, pivaloylamino, lauroylamino, benzoylamino and 3,4,5-tri-n-octyloxyphenylcarbonylamino.

As the aminocarbonylamino group, a substituted or unsubstituted aminocarbonylamino group having 1 to 30 carbon atoms can be mentioned. Specific examples include carbamoylamino, N,N-dimethylaminocarbonylamino, N,N-diethylaminocarbonylamino and morpholinocarbonylamino.

As the alkoxycarbonylamino group, a substituted or unsubstituted alkoxycarbonylamino group having 2 to 30 carbon atoms can be mentioned. Specific examples include methoxycarbonylamino, ethoxycarbonylamino, t-butoxycarbonylamino, n-octadecyloxycarbonylamino and N-methylmethoxycarbonylamino.

As the aryloxycarbonylamino group, a substituted or unsubstituted aryloxycarbonylamino group having 7 to 30 carbon atoms can be mentioned. Specific examples include phenoxycarbonylamino, p-chlorophenoxycarbonylamino and m-n-octyloxyphenoxycarbonylamino.

As the sulfamoylamino group, a substituted or unsubstituted sulfamoylamino group having 0 to 30 carbon atoms can be mentioned. Specific examples include sulfamoylamino, N,N-dimethylaminosulfonylamino and N-n-octylaminosulfonylamino.

As the alkylsulfonylamino group and arylsulfonylamino group, a substituted or unsubstituted alkylsulfonylamino group having 1 to 30 carbon atoms and a substituted or unsubstituted arylsulfonylamino group having 6 to 30 carbon atoms can be mentioned. Specific examples include methylsulfonylamino, butylsulfonylamino, phenylsulfonylamino, 2,3,5-trichiorophenylsulfonylamino and p-methylphenylsulfonylamino.

As the alkylthio group, a substituted or unsubstituted alkylthio group having 1 to 30 carbon atoms can be mentioned. Specific examples include methylthio, ethylthio and n-hexadecylthio.

As the arylthio group, a substituted or unsubstituted arylthio group having 6 to 30 carbon atoms can be mentioned. Specific examples include phenylthio, p-chlorophenylthio and m-methoxyphenylthio.

As the heterocyclicthio group, a substituted or unsubstituted heterocyclicthio group having 2 to 30 carbon atoms can be mentioned. Specific examples include 2-benzothiazolylthio and 1-phenyitetrazol-5-ylthio.

As the sulfamoyl group, a substituted or unsubstituted sulfamoyl group having 0 to 30 carbon atoms can be mentioned. Specific examples include N-ethylsulfamoyl, N-(3-dodecyloxypropyl) sulfamoyl, N,N-dimethylsulfamoyl, N-acetylsulfamoyl, N-benzoylsulfamoyl, and N-(N'-phenylcarbamoyl)sulfamoyl.

As the alkylsulfinyl group and arylsulfinyl group, a substituted or unsubstituted alkylsulfinyl group having 1 to 30 carbon atoms and a substituted or unsubstituted arylsulfinyl group having 6 to 30 carbon atoms can be mentioned. Specific examples include methylsulfinyl, ethylsulfinyl, phenylsulfinyl and p-methylphenylsulfinyl.

As the alkylsulfonyl group and arylsulfonyl group, a substituted or unsubstituted alkylsulfonyl group having 1 to 30 carbon atoms and a substituted or unsubstituted arylsulfonyl group having 6 to 30 carbon atoms can be mentioned. Specific examples include methylsulfonyl, ethylsulfonyl, phenylsulfonyl and p-toluenesulfonyl.

As the acyl group, a formyl group, a substituted or unsubstituted alkylcarbonyl group having 2 to 30 carbon atoms, a substituted or unsubstituted arylcarbonyl group having 7 to 30 carbon atoms, and a substituted or unsubstituted heterocyclic carbonyl group having 4 to 30 carbon atoms in which the carbonyl group is bonded to a carbon atom can be mentioned. Specific examples include acetyl, pivaloyl, 2 chloroacetyl, stearoyl, benzoyl, p-n-octyloxyphenylcarbonyl, 2-pyridylcarbonyl and 2-furylcarbonyl.

As the aryloxycarbonyl group, a substituted or unsubstituted aryloxycarbonyl group having 7 to 30 carbon atoms can be mentioned. Specific examples include phenoxycarbonyl, o-chlorophenoxycarbonyl, m-nitrophenoxycarbonyl, and p-t-butylphenoxycarbonyl.

As the alkoxycarbonyl group, a substituted or unsubstituted alkoxycarbonyl group having 2 to 30 carbon atoms can be mentioned. Specific examples include methoxycarbonyl, ethoxycarbonyl, t-butoxycarbonyl and n-octadecyloxycarbonyl.

As the carbamoyl group, a substituted or unsubstituted carbamoyl group having 1 to 30 carbon atoms can be mentioned. Specific examples include carbamoyl, N-methylcarbamoyl, N,N-dimethylcarbamoyl, N,N-di-n-octylcarbamoyl and N-(methylsulfonyl)carbamoyl.

As the phosphino group, a substituted or unsubstituted phosphino group having 2 to 30 carbon atoms can be mentioned. Specific examples include dimethyiphosphino, diphenylphosphino and methylphenoxyphosphino.

As the phosphinyl group, a substituted or unsubstituted phosphinyl group having 2 to 30 carbon atoms can be mentioned. Specific examples include phosphinyl, dioctyloxyphosphinyl and diethoxyphosphinyl.

As the phosphinyloxy group, a substituted or unsubstituted phosphinyloxy group having 2 to 30 carbon atoms can be mentioned. Specific examples include diphenoxyphosphinyloxy and dioctyloxyphosphinyloxy.

As the phosphinylamino group, a substituted or unsubstituted phosphinylamino group having 2 to 30 carbon atoms can be mentioned. Specific examples include dimethoxyphosphinylamino and dimethylaminophosphinylamino.

As the silyl group, a substituted or unsubstituted silyl group having 3 to 30 carbon atoms can be mentioned. Specific examples include trimethylsilyl, t-butyldimethylsilyl and phenyldimethylsilyl.

Specific examples of the azo group include phenylazo, 4-methoxyphenylazo, 4-pivaloylaminophenylazo and 2-hydroxy-4-propanoylphenylazo.

Specific examples of the imido group include N-succinimido and N-phthalimido.

These substituents can be further substituted. Examples in such a case include a linear or branched alkyl group having 1 to 12 carbon atoms, a linear or branched aralkyl group having 7 to 18 carbon atoms, a linear or branched alkenyl group having 2 to 12 carbon atoms, a linear or branched alkynyl group having 2 to 12 carbon atoms, a linear or branched cycloalkyl group having 3 to 12 carbon atoms and a linear or branched cycloalkenyl group having 3 to 12 carbon atoms. These substituents desirably have a branched chain, and more desirably an asymmetric carbon, because dye solubility and ink stability are enhanced.

Specific examples of the substituent include: substituted or unsubstituted alkyl groups, such as methyl, ethyl, propyl, isopropyl, secbutyl, t-butyl, 2-ethylhexyl, 2-methylsulfonylethyl, 3-phenoxypropyl, trifluoromethyl and cyclopentyl; a halogen atom, such as a chlorine atom and a bromine atom; an aryl group, such as phenyl, 4-t-butylphenyl and 2,4-di-t-amylphenyl; a heterocyclic group, such as imidazolyl, pyrazolyl, triazolyl, 2-furyl, 2-thienyl, 2-pyrimidinyl and 2-benzothiazolyl; a cyano group; a hydroxyl group; a nitro group; a carboxy group; an amino group; an alkyloxy group, such as methoxy, ethoxy, 2-methoxyethoxy and 2-methylsulfonylethoxy; an aryloxy group, such as phenoxy, 2-methylphenylethoxy, 4-t-butylphenoxy, 3-nitrophenoxy, 3-t-butyloxy-carbonylphenoxy and 3-methoxycarbonylphenyloxy; an acylamino group, such as acetamido, benzamido and 4-(3-t-butyl-4-hydroxyphenoxy)butanamido; an alkylamino group such as methylamino, butylamino, diethylamino and methylbutylamino; an anilino group, such as phenylamino and 2-chloroanilino; a ureido group, such as phenylureido, methylureido and N,N-dibutylureido; a sulfamoylamino group, such as N,N-dipropylsulfamoylamino; an alkylthio group, such as methylthio, octylthio and 2-phenoxyethylthio; an arylthio group, such as phenylthio, 2-butoxy-5-t-octylphenylthio and 2-carboxyphenylthio; an alkyloxycarbonylamino group, such as methoxycarbonylamino; an alkylsulfonylamino or arylsulfonylamino group, such as methylsulfonylamino, phenylsulfonylamino and p-toluenesulfonylamino; a carbamoyl group, such as N-ethylcarbamoyl and N,N-dibutylcarbamoyl; a sulfamoyl group, such as N-ethylsulfamoyl, N,N-dipropylsulfamoyl and N-phenylsulfamoyl; a sulfonyl group, such as methylsulfonyl, octylsulfonyl, phenylsulfonyl and p-toluenesulfonyl; an alkyloxycarbonyl group, such as methoxycarbonyl and butyloxycarbonyl; a heterocyclicoxy group, such as 1-phenyltetrazol-5-oxy and 2-tetrahydropyranyloxy; an azo group, such as phenylazo, 4-methoxyphenylazo, 4-pivaloylaminophenylazo and 2-hydroxy-4-propanoylphenylazo; an acyloxy group, such as acetoxy; a carbamoyloxy group, such as, N-methylcarbamoyloxy and N-phenylcarbamoyloxy; a silyloxy group, such as trimethylsilyloxy and dibutylmethylsilyloxy; an aryloxycarbonylamino group, such as phenoxycarbonylamino; an imido group, such as N-succinimido and N-phthalimido; a heterocyclicthio group, such as 2-benzothiazolylthio, 2,4-di-phenoxy-1,3,5-triazole-6-thio and 2-pyridylthio; a sulfinyl group, such as 3-phenoxypropylsulfinyl; a phosphonyl group, such as phenoxyphosphonyl, octyloxyphosphonyl and phenylphosphonyl; an aryloxycarbonyl group, such as phenoxycarbonyl; an acyl group, such as acetyl, 3-phenylpropanoyl and benzoyl; and an ionic hydrophilic group, such as a carboxyl group, a sulfonic acid group, a phosphono group and a quaternary ammonium group.

$X_1$ and $X_2$ in the general formula (I) and the general formula (II) represent an electron withdrawing group having a Hammett's σp value of 0.20 or more. Here, the Hammett equation and Hammett's substituent constant, σp value (hereinafter, referred to as a Hammett's σp value) will be described. The Hammett equation is an empirical rule proposed by L. P. Hammett in 1935 to quantitatively discuss an influence of a substituent exerted on a reaction and equilibrium of a benzene derivative, and nowadays, its validity has been widely recognized. Substitution constants found by the Hammett equation include a σp value and a σm value, and these values are described in many general scientific articles. There are specific descriptions in, for example, Lange's Handbook of Chemistry edited by J. A. Dean, 12th edition, 1979, McGraw-Hill, and Region of Chemistry, extra number, No. 122, pp 96-103, 1979, Nankodo Co., Ltd.

In the present invention, each substituent is defined by the Hammett's σp value. However, the present invention is not limited to only substituents whose σp values are specifically described in the documents as described above. Even substituents whose σp values are not described in the aforementioned documents are included in the present invention, if, when σp values are calculated based on the Hammett equation, they are considered to fall within the range. Furthermore, although a compound of general formula (I) and a compound of general formula (II) are not a benzene derivative, in the present Invention, the σp value is used as a measure for showing the electron effect of a substituent irrespective of the substitution site. In the following, specific examples of substituents which can be used as an electron withdrawing group having a Hammett's σp value of 0.20 or more for the substituents of a compound of general formula (I) or a compound of general formula (II) are listed in order of their Hammett's σp value.

Examples of electron withdrawing groups having a Hammett's σp value of 0.60 or more include the following: a cyano group, a nitro group and an alkylsulfonyl group (e.g., arylsulfonyl groups, such as a methanesulfonyl group and a benzenesulfonyl group).

Examples of electron withdrawing groups having a Hammett's σp value of 0.45 or more include, in addition to those described above, the following: an acyl group (e.g., an acetyl group), an alkoxycarbonyl group (e.g., a dodecyloxycarbonyl group), an aryloxycarbonyl group (e.g., a m-chlorophenoxycarbonyl group), an alkylsulfinyl group (e.g., an n-propylsulfinyl group), an arylsulfinyl group (e.g., phenylsulfinyl group), a sulfamoyl group (e.g., an N-ethylsulfamoyl group, an N,N-dimethylsulfamoyl group) and a halogenated alkyl group (e.g., a trifluoromethyl group).

Examples of electron withdrawing groups having a Hammett's σp value of 0.30 or more include, in addition to those described above, the following: an acyloxy group (e.g., an acetoxy group), a carbamoyl group (e.g., an N-ethylcarbamoyl group, an N,N-dibutylcarbamoyl group), a halogenated alkoxy group (e.g., a trifluoromethyloxy group), a halogenated aryloxy group (e.g., a pentafluorophenyloxy group, a sulfonyloxy group (e.g., a methylsulfonyloxy group), a halogenated alkylthio group (e.g., a difluoromethylthio group), an aryl group substituted with 2 or more electron withdrawing groups whose σp values are 0.15 or more (e.g., a 2,4-dinitrophenyl group, a pentachlorophenyl group) and a heterocycle (e.g., a 2 benzoxazolyl group, a 2-benzothiazolyl group and a 1-phenyl-2-benzimidazolyl group).

Examples of electron withdrawing group having a Hammett's σp value of 0.20 or more include, in addition to those described above, halogen atoms (e.g. fluorine atom, chlorine atom, bromine atom).

$Z_1$ and $Z_2$ in the general formula (I) are each independently one of the following substituents. Specifically, a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocycle group. Examples of the substituted or unsubstituted alkyl group include the same as previously mentioned as the alkyl group for $R_1, R_2, Y_1$ and $Y_2$. Examples of the substituted or unsubstituted alkenyl group include the same as previously mentioned as the alkenyl group for $R_1, R_2, Y_1$ and $Y_2$. Examples of the substituted or unsubstituted alkynyl group include the same as previously mentioned as the alkynyl group for $R_1, R_2, Y_1$ and $Y_2$. Examples of the substituted or unsubstituted aralkyl group include the same as previously mentioned as the aralkyl group for $R_1, R_2, Y_1$ and $Y_2$. Examples of the substituted or unsubstituted aryl group include the same as previously mentioned as the aryl group for $R_1, R_2, Y_1$ and $Y_2$. Examples of the substituted or unsubstituted heterocycle group include the same as previously mentioned as the heterocycle group for $R_1, R_2, Y_1$ and $Y_2$. These substituents can be further substituted. Examples in such a case include the same groups mentioned as a further substituent group for $R_1, R_2, Y_1$ and $Y_2$.

Each M in the general formula (I) and the general formula (II) independently represents a hydrogen atom, an alkali metal, ammonium or organic ammonium. Examples of the alkali metal include lithium, sodium and potassium. Examples of the organic ammonium include acetamide, benzamide, methylamino, butylamino, diethylamino and phenylamino.

Preferred examples of a compound of the general formula (I) or a compound of the general formula (II) include the following exemplified compounds 1 to 14. Note that the following exemplified compounds are described in the form of a free acid. Of course, in the present invention, it is not limited to the following exemplified compounds so long as a compound is included in the structure of one of the general formula (I) and the general formula (II) and the definition thereof. In the present invention, it is particularly preferred to use the exemplified compounds 5, 6, 7, 8 and 10 in the following exemplified compounds.

Exemplified Compound 1

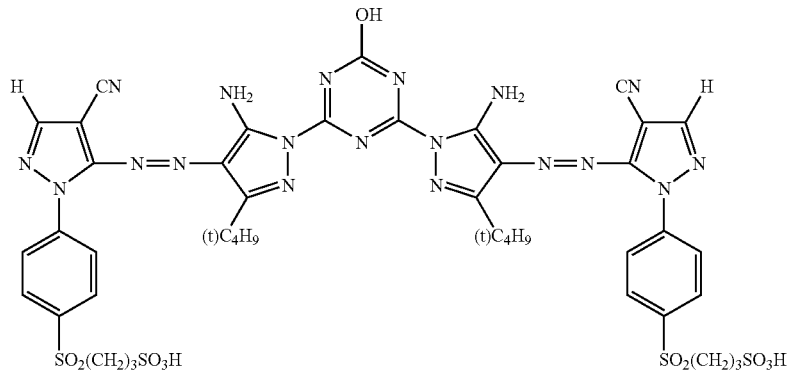

-continued
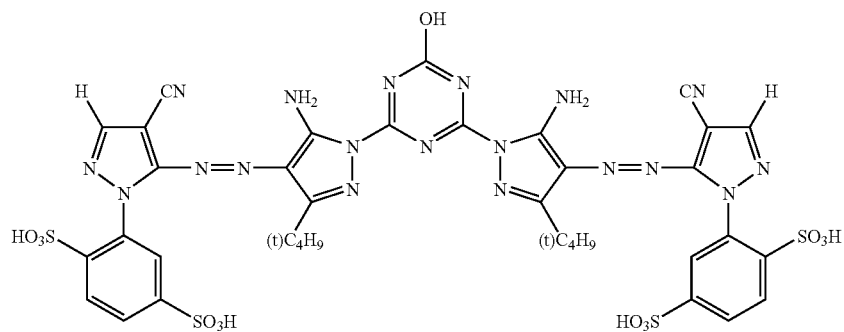
Exemplified Compound 2
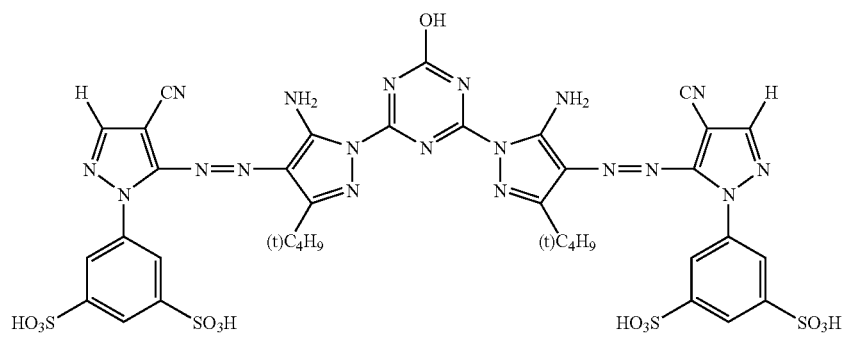
Exemplified Compound 3
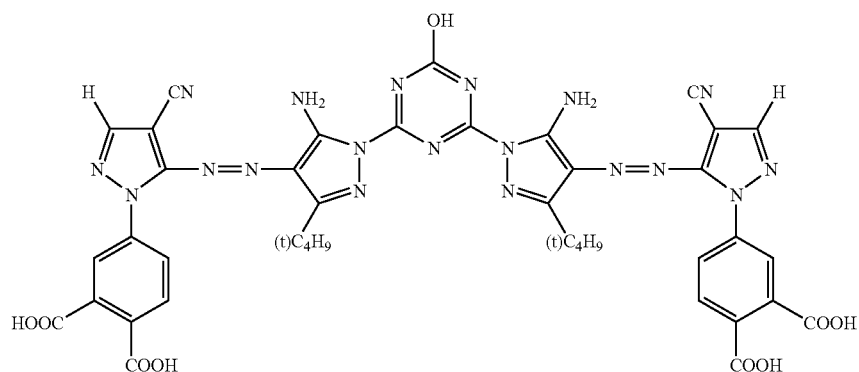
Exemplified Compound 4
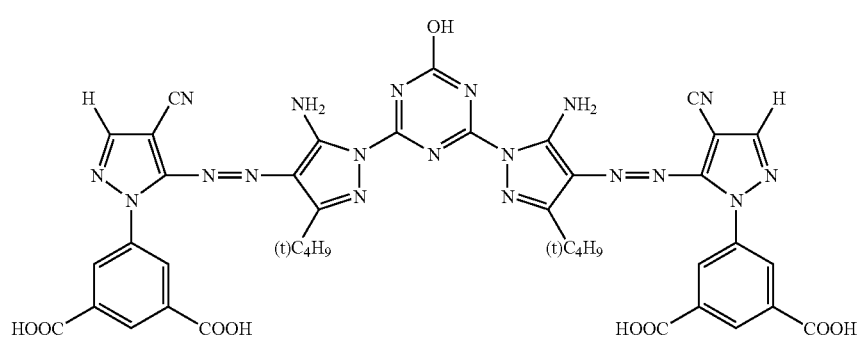
Exemplified Compound 5

-continued
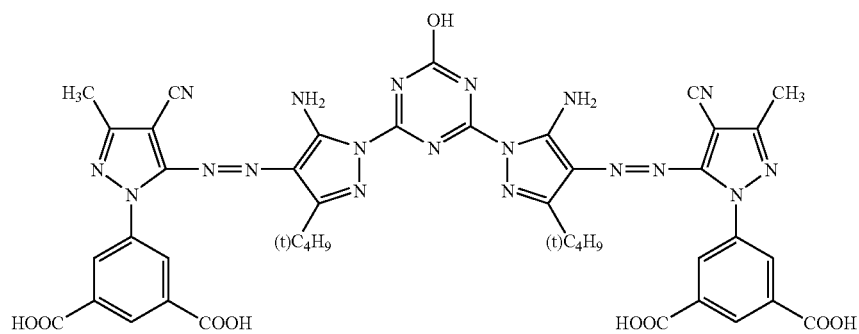
Exemplified Compound 6
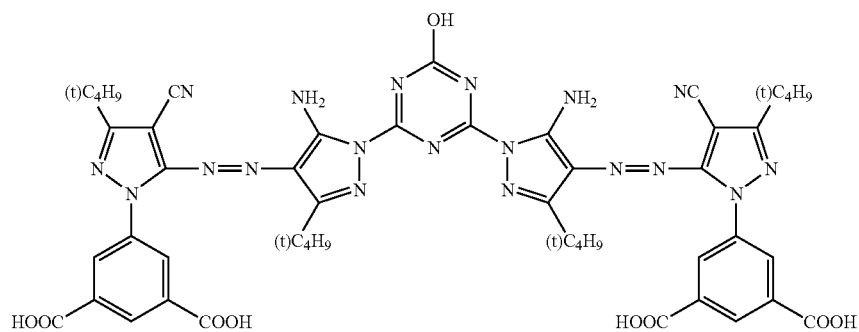
Exemplified Compound 7
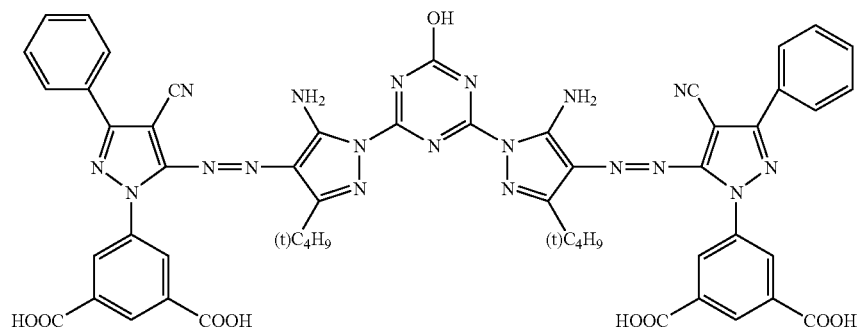
Exemplified Compound 8
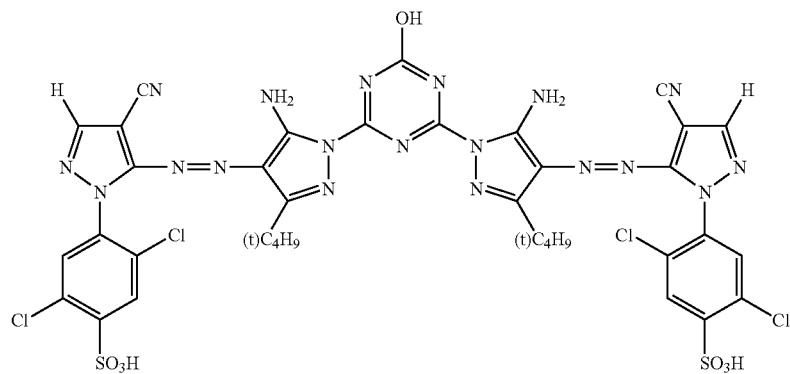
Exemplified Compound 9

-continued
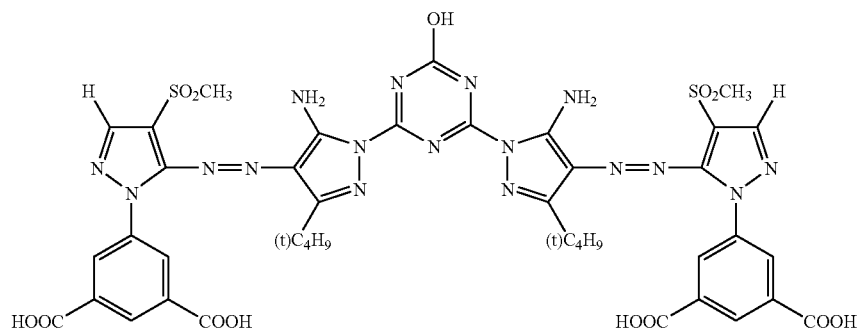
Exemplified Compound 10
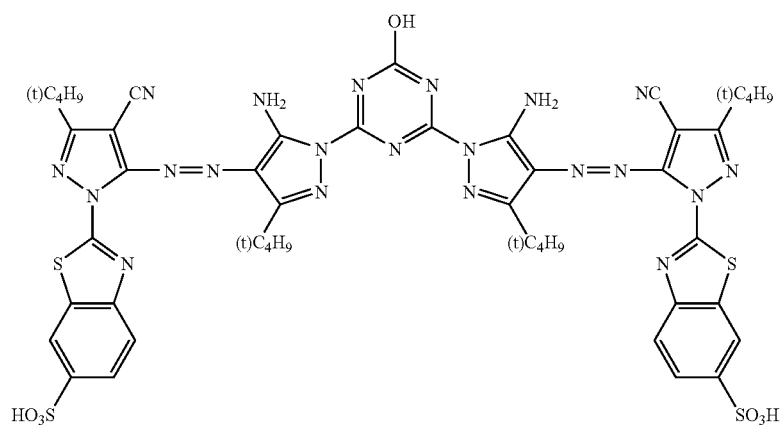
Exemplified Compound 11
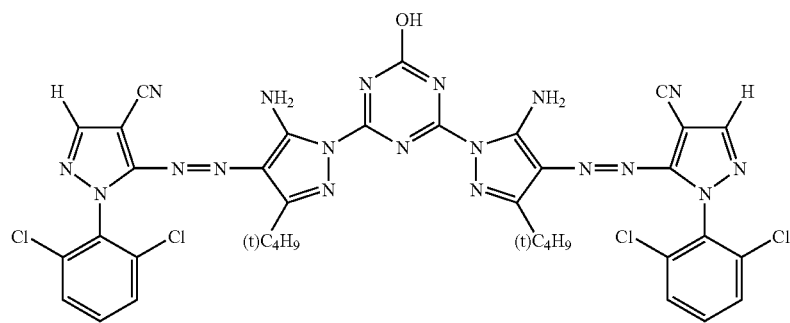
Exemplified Compound 12

-continued

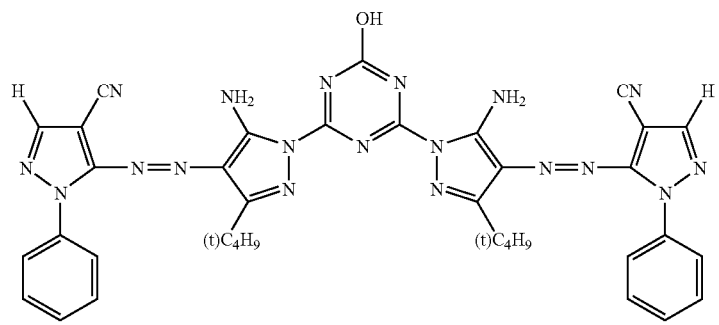

Exemplified Compound 13

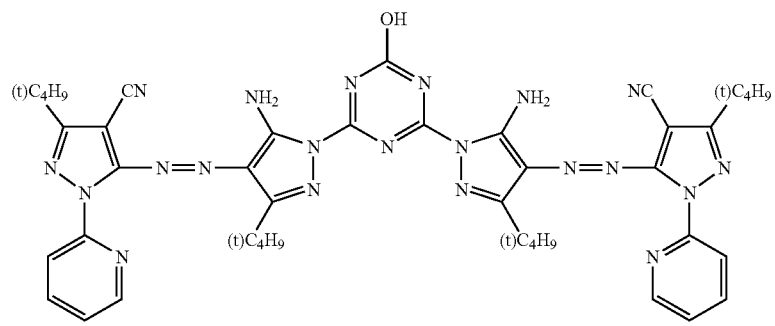

Exemplified Compound 14

[One example of the second coloring material: a compound represented by the general formula (III) and a compound represented by the general formula (IV)]

The ink of the present invention uses a coloring material having a pH buffering ability as the second coloring material in addition to a compound of the general formula (I) or a compound of the general formula (II) described above which is used as the first coloring material. Therefore, any coloring material can be used as the second coloring material so long as it has an ink pH buffering ability. In the present invention, these general formulae will be described in more detail. A compound of the general formula (III) and a compound of the general formula (IV) are excellent in lightfastness and color developabilities, and have a pH buffering ability. Further, a compound of the general formula (III) and a compound of the general formula (IV) can obtain a synergistic effect by using in combination with a compound of the general formula (I) or a compound of the general formula (II), and can produce an ink capable of forming an image having a desirable yellow color tone.

General Formula (III)

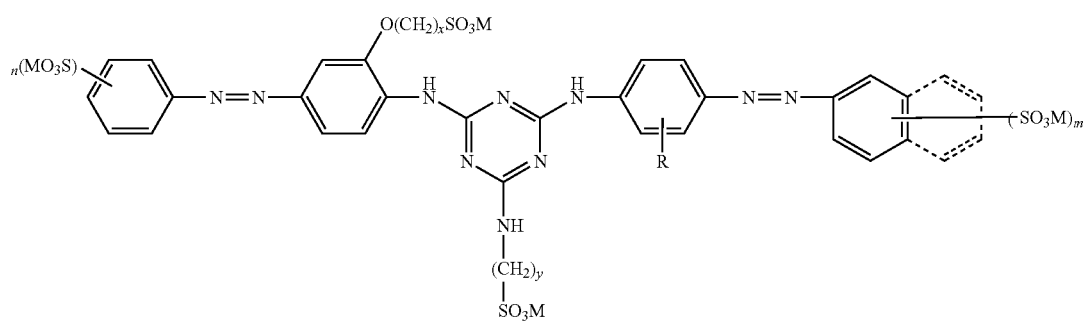

it is preferred to use a compound of the general formula (III) as the second coloring material, and among coloring materials having such a structure, it is preferred to use a compound of the general formula (IV). Hereinafter, the compounds of (wherein R represents a hydrogen atom, an alkyl group having 1 to 4 carbon atoms, an alkoxy group having 1 to 4 carbon atoms or a sulfonic acid group; n is an integer of 1 or 2; m is an integer of 1 to 3; x is an integer of 2 to 4; y is an integer of 1 to 3; and each M independently represents a hydrogen atom, an alkali metal, ammonium or organic ammonium).

General Formula (IV)

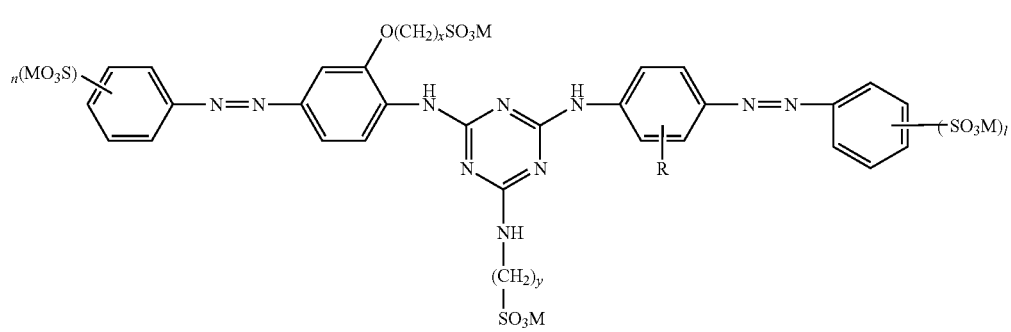

(wherein R represents a hydrogen atom, an alkyl group having 1 to 4 carbon atoms, an alkoxy group having 1 to 4 carbon atoms or a sulfonic acid group; n is an integer of 1 or 2; l is an integer of 1 or 2; x is an integer of 2 to 4; and y is an integer of 1 to 3; and each M independently represents a hydrogen atom, an alkali metal, ammonium or organic ammonium).

R in general formula (III) and general formula (IV) represents the following substituents. Specifically, a hydrogen atom, an alkyl group having 1 to 4 carbon atoms, an alkoxy group having 1 to 4 carbon atoms and a sulfonic acid group can be mentioned. Examples of the alkyl group having 1 to 4 carbon atoms include a methyl group, an ethyl group, a propyl group and a butyl group. Examples of the alkoxy group having 1 to 4 carbon atoms include a methoxy group, an ethyoxy group, a propoxy group and a butoxy group. Each M in the general formula (III) and the general formula (IV) independently represents a hydrogen atom, an alkali metal, ammonium or organic ammonium. Examples of the alkali metal include lithium, sodium and potassium. Examples of the organic ammonium include acetamide, benzamide, methylamino, butylamino, diethylamino and phenylamino.

Preferred examples of a compound of the general formula (III) or a compound of the general formula (IV) include the following exemplified compounds 15 to 49. Note that the following exemplified compounds are described in the form of a free acid. Of course, in the present invention, it is not limited to the following exemplified compounds as long as a compound is included in the structure of one of the general formula (III) and the general formula (IV) and the definition thereof. In the present invention, it is particularly preferred to use exemplified compound 16 in the following exemplified compounds.

Exemplified Compound 15

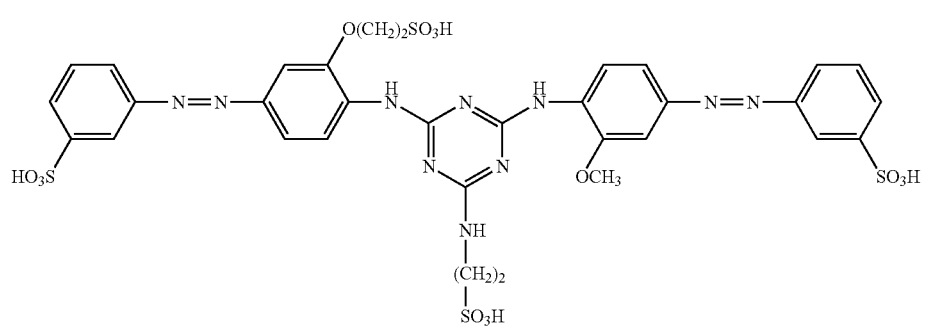

Exemplified Compound 16

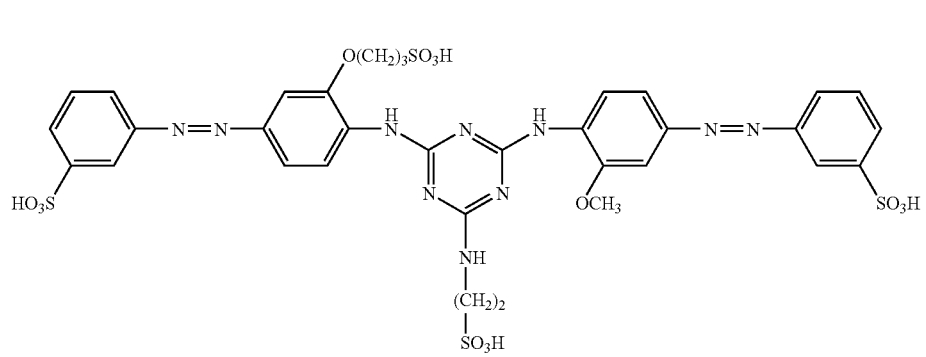

-continued
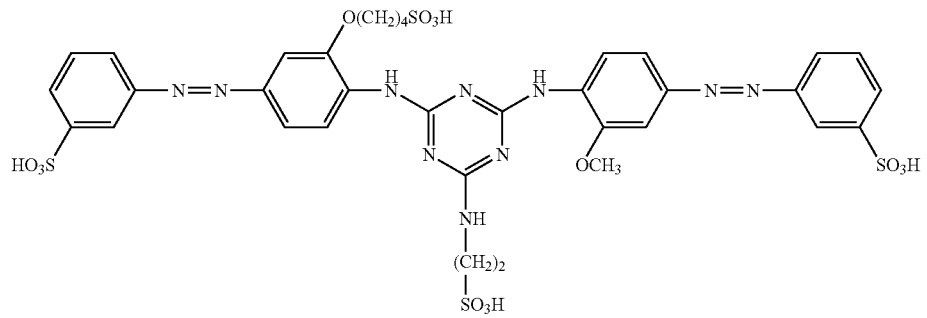
Exemplified Compound 17
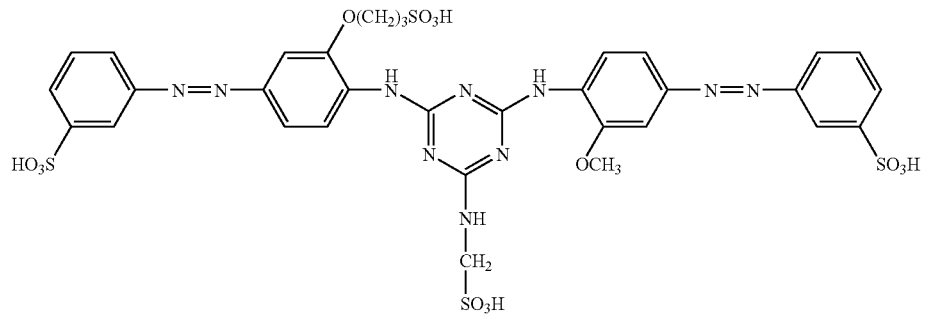
Exemplified Compound 18
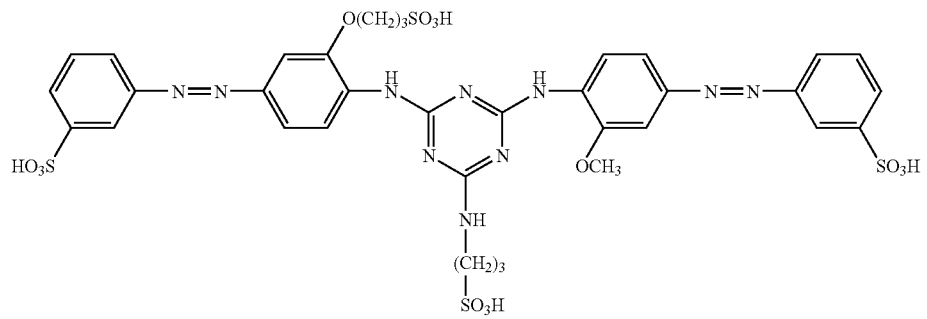
Exemplified Compound 19
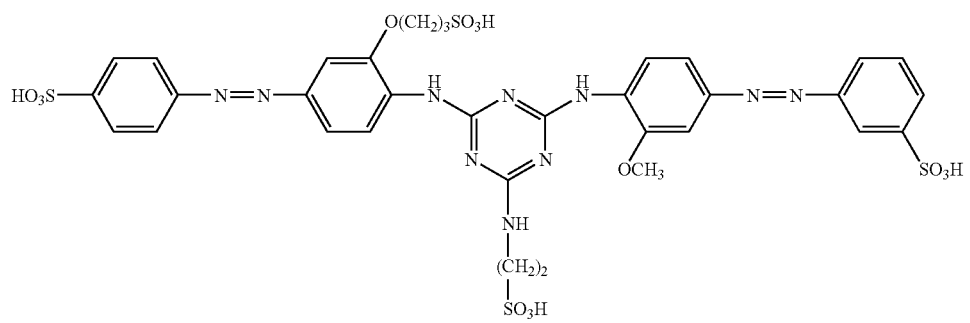
Exemplified Compound 20
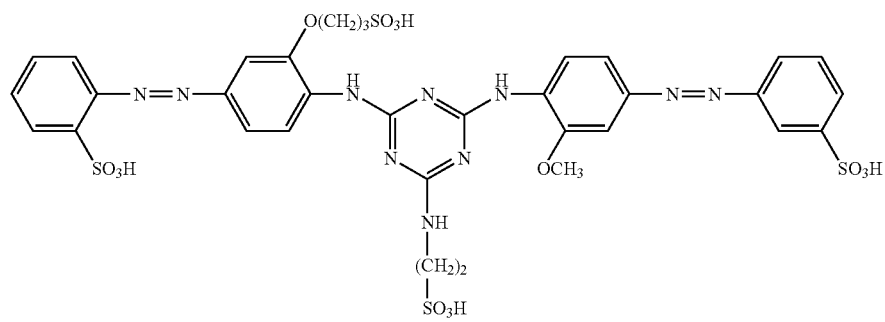
Exemplified Compound 21

-continued
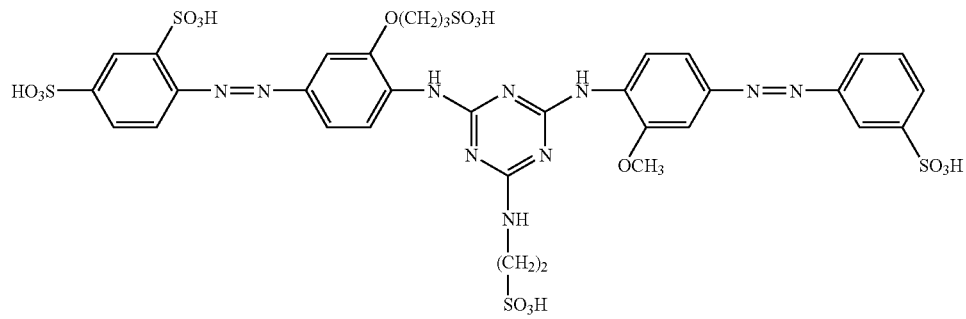
Exemplified Compound 22
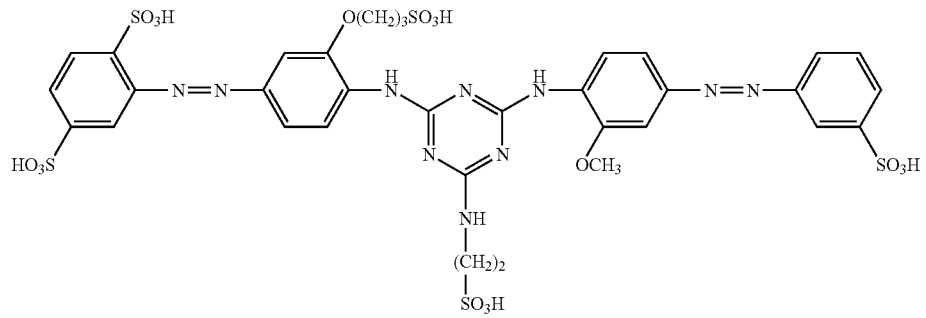
Exemplified Compound 23
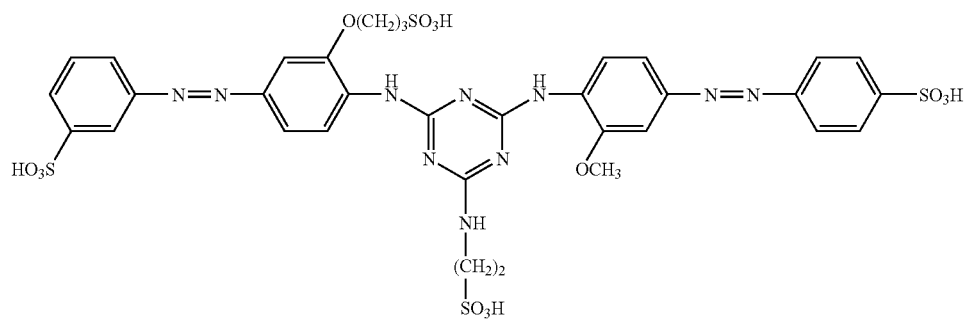
Exemplified Compound 24
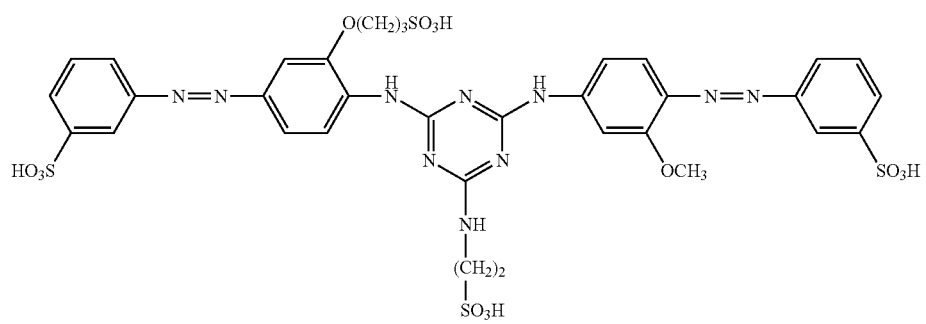
Exemplified Compound 25
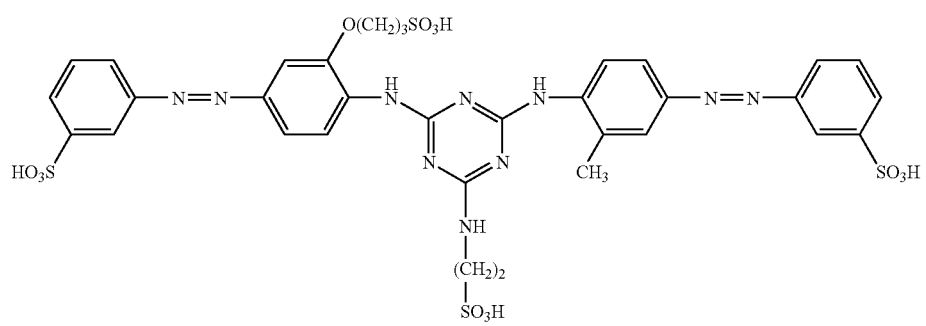
Exemplified Compound 26

-continued
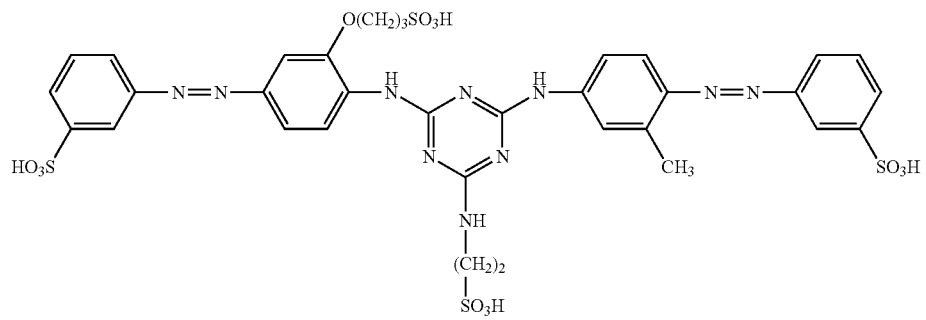
Exemplified Compound 27
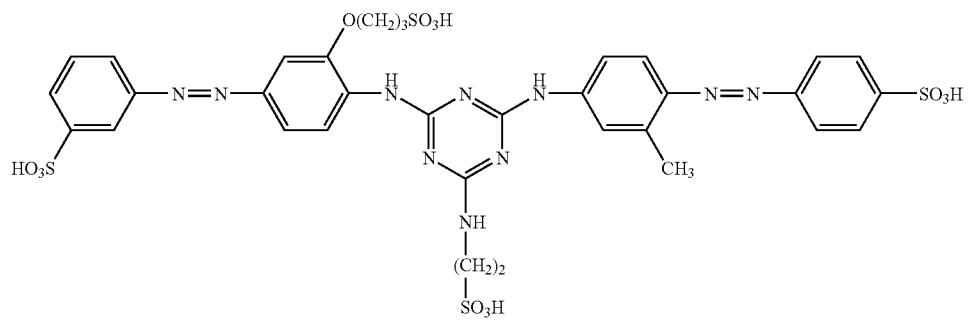
Exemplified Compound 28
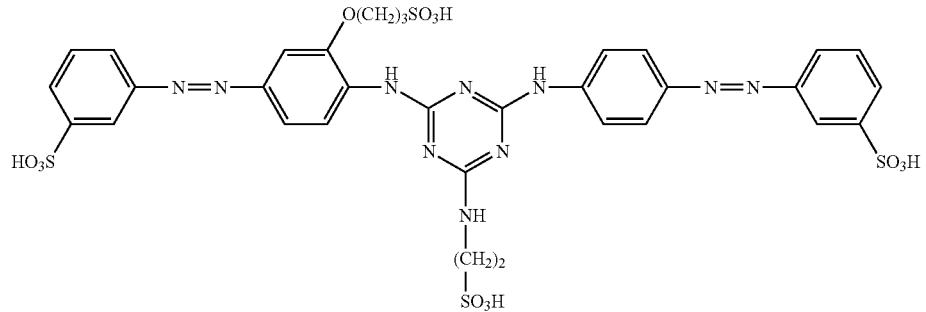
Exemplified Compound 29
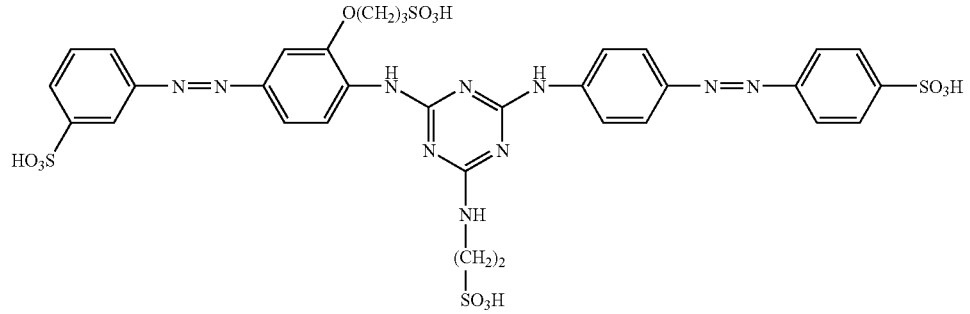
Exemplified Compound 30
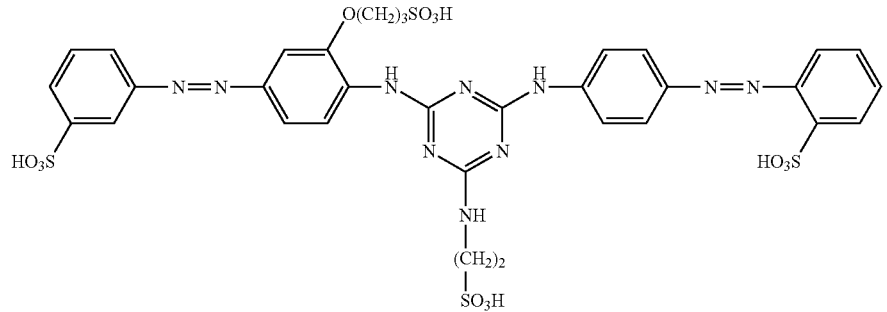
Exemplified Compound 31

-continued
Exemplified Compound 32
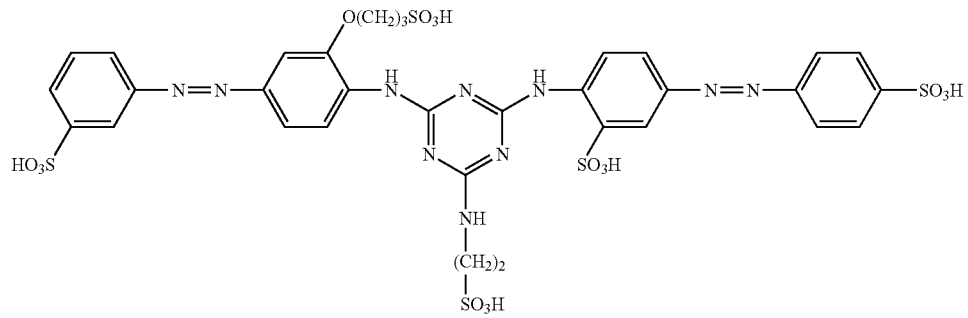
Exemplified Compound 33
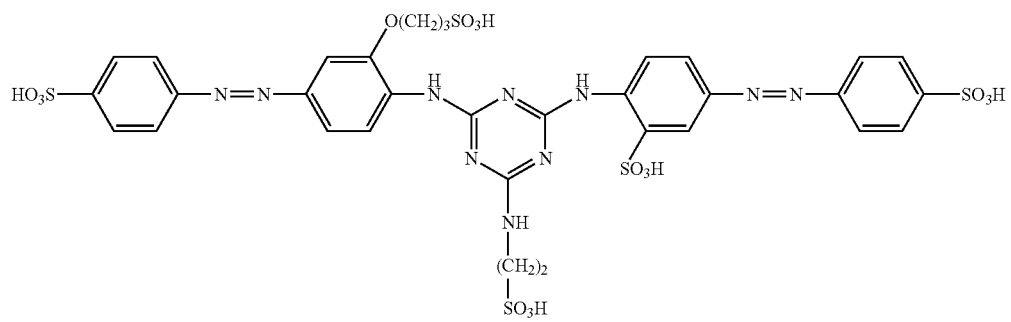
Exemplified Compound 34
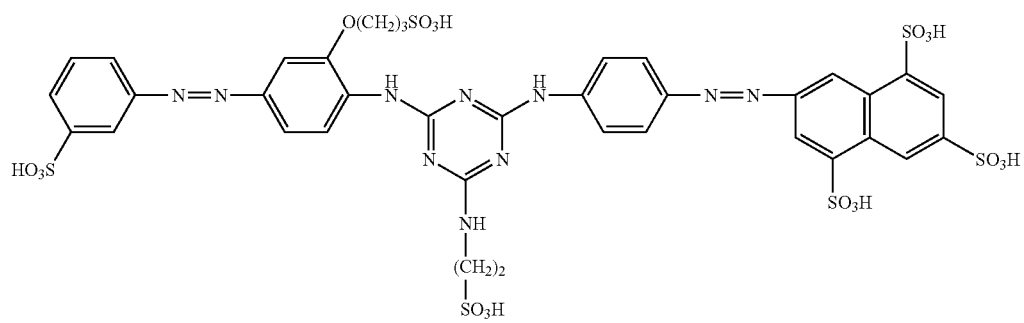
Exemplified Compound 35
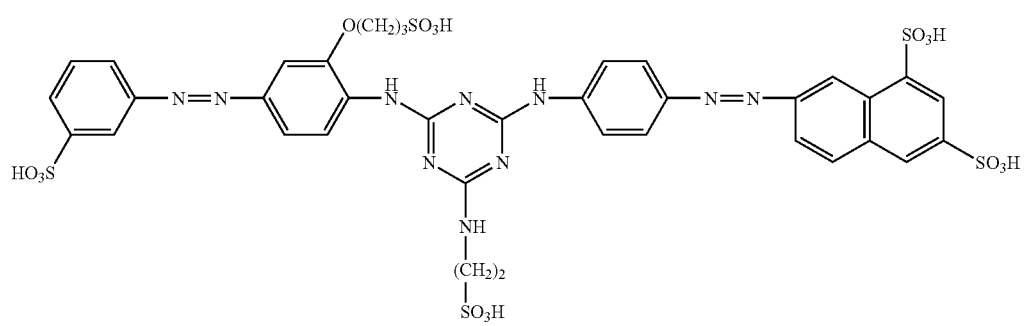

-continued
Exemplified Compound 36
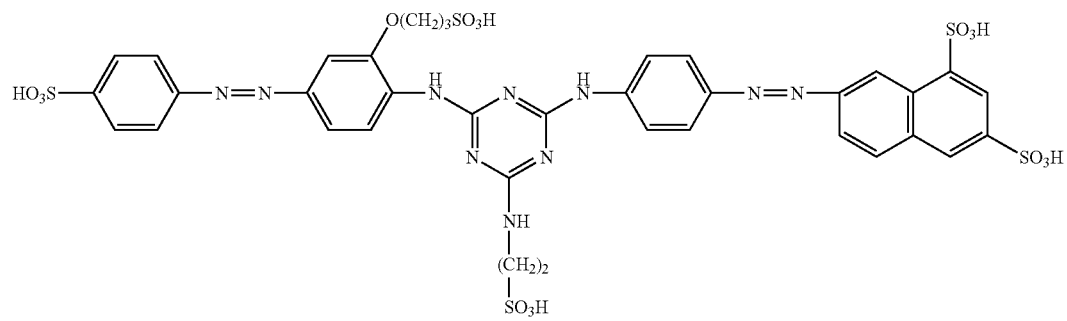
Exemplified Compound 37
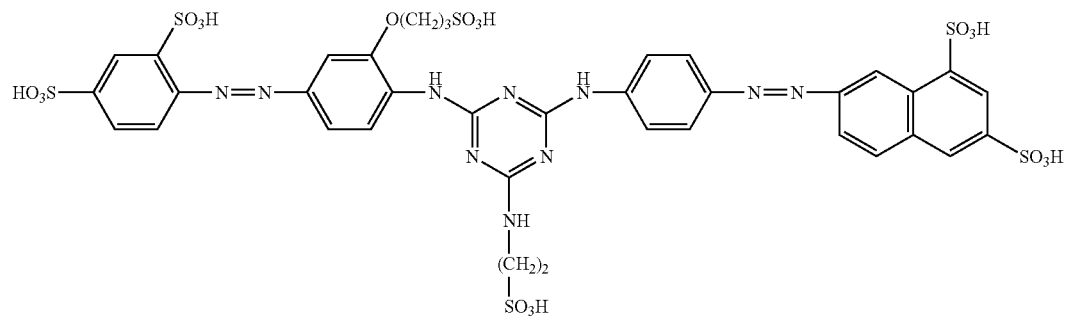
Exemplified Compound 38
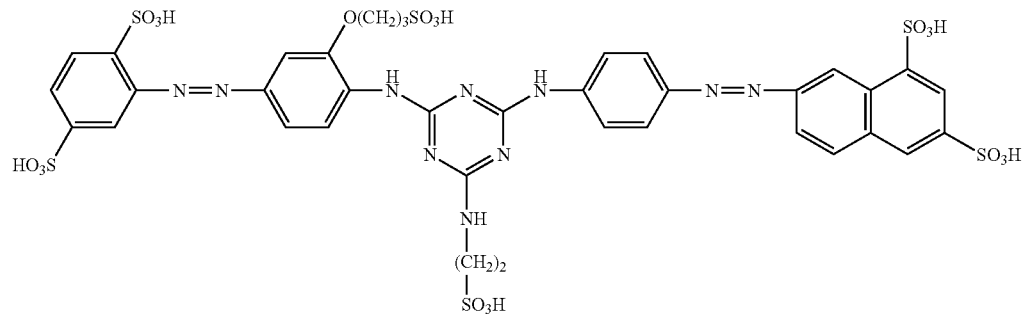
Exemplified Compound 39
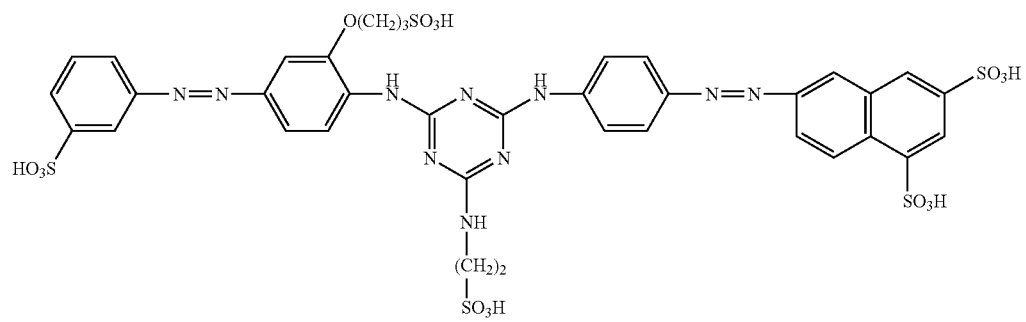

-continued
Exemplified Compound 40
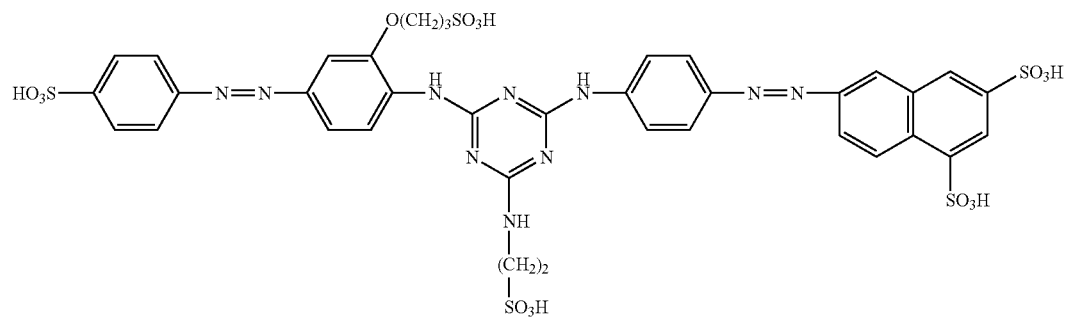
Exemplified Compound 41
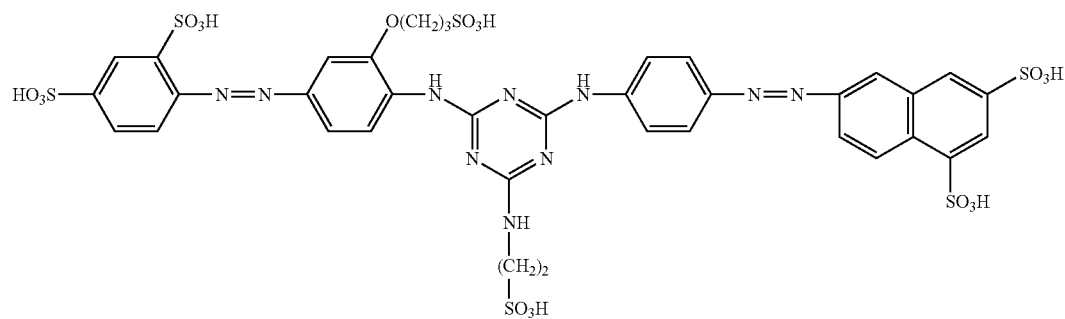
Exemplified Compound 42
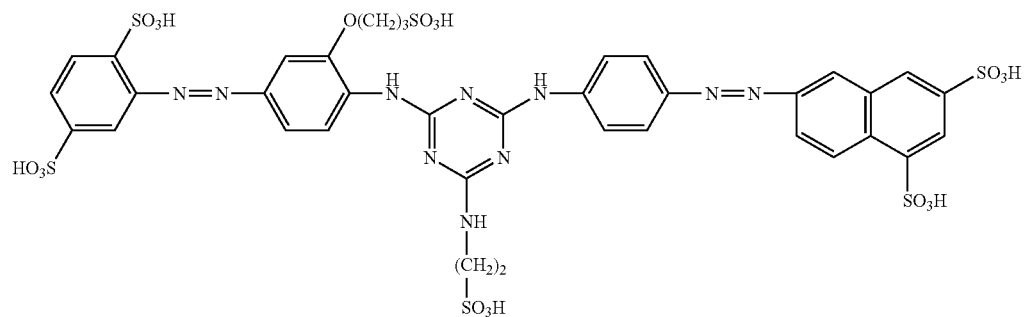
Exemplified Compound 43
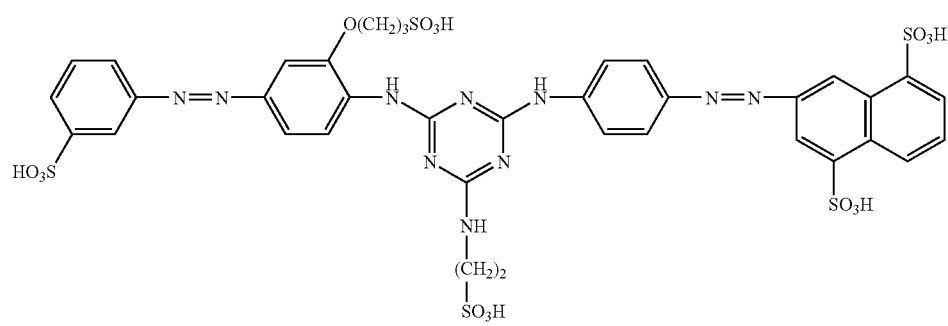

-continued
Exemplified Compound 44
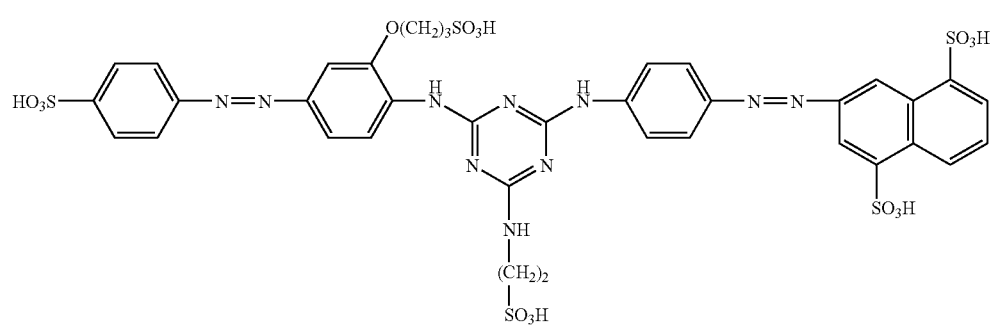
Exemplified Compound 45
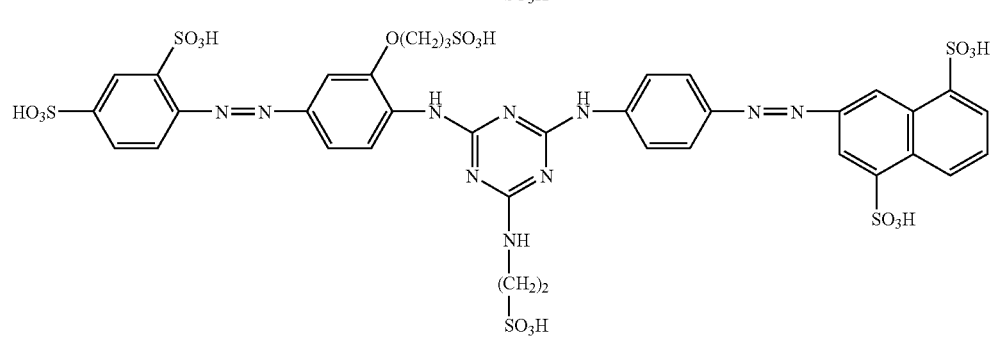
Exemplified Compound 46
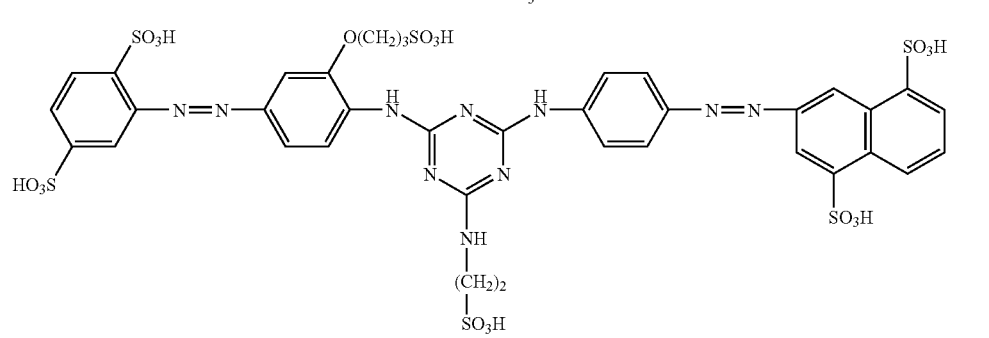
Exemplified Compound 47
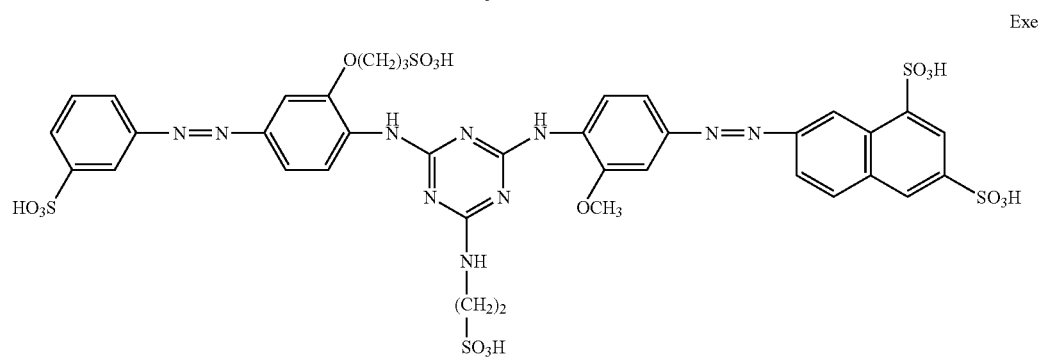
Exemplified Compound 48
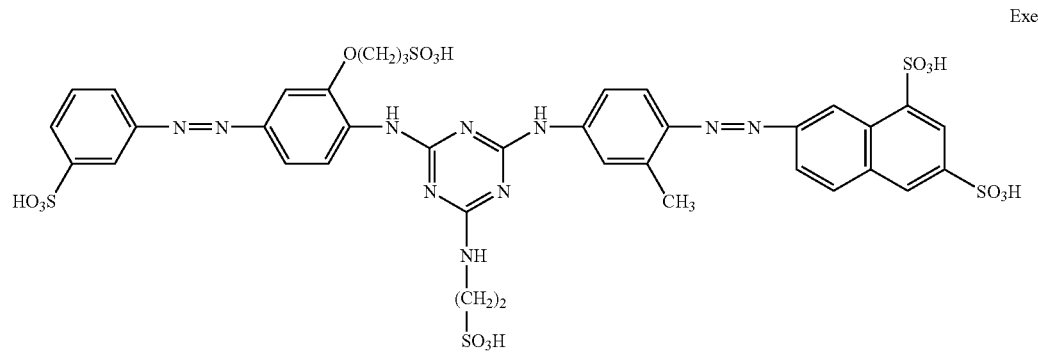

-continued

Exemplified Compound 49

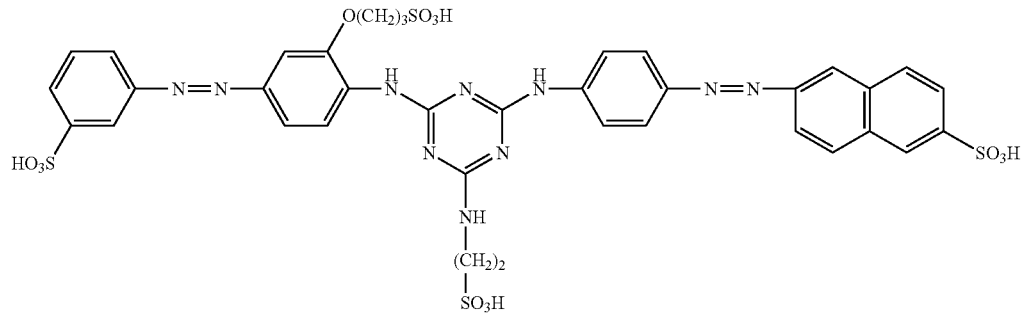

[Verification Method of a Coloring Material]

The following verification methods (1) to (3) using high performance liquid chromatography (HPLC) is applicable to the verification of whether the coloring material used in the present invention is contained in ink or not.

(1) Peak retention time
(2) Maximum absorption wavelength for the peak of (1)
(3) M/Z (posi) and M/Z (nega) of the mass spectrum for the peak of (1)

The analysis conditions of high performance chromatography are as shown below. A liquid (ink) diluted with pure water by about 1,000 times was used as a sample for measurement. Then, analysis by high performance chromatography was performed under the following conditions to measure the peak retention time and the maximum absorption wavelength of the peak.

Column: Sun Fire $C_{18}$ (manufactured by Japan Waters Co., Ltd.), 2.1 mm×150 mm, column temperature: 40° C.

Flow rate: 0.2 mL/min
PDA: 200 nm to 700 nm
Mobile phase and gradient conditions: Table 1 below

TABLE 1

| Mobile Phase and Gradient Conditions | | | | |
|---|---|---|---|---|
| | 0 to 5 min. | 5 to 24 min. | 24 to 31 min. | 31 to 45 min. |
| A: Water | 85% | 85→45% | 45→0% | 0% |
| B: Methanol | 10% | 10→50% | 50→95% | 95% |
| C: 0.2 mol/L Aqueous Ammonium Acetate Solution | 5% | 5% | 5% | 5% |

In addition, analysis conditions for a mass spectrum are as shown below. The mass spectrum of the resulting peak is measured under the following conditions, and the M/Z detected most strongly is measured for each of positive and negative.

Ionization method
ESI
Capillary voltage: 3.5 kV
Desolvation gas: 300° C.
Ion source temperature: 120° C.
Detector
posi: 40 V 200 to 1,500 amu/0.9 sec
nega: 40 V 200 to 1,500 amu/0.9 sec The measurement was made under the above-described method and conditions for an exemplified compound 5 which is a specific example of the first coloring material and an exemplified compound 16 which is a specific example of the second coloring material, as representative examples of respective coloring materials. Table 2 shows the resulting values of retention time, maximum absorption wavelength, M/Z (posi), and M/Z (nega). When the measurement is made under the same method and conditions as described above for an unknown ink and the resulting measured values are in the range of the values shown in Table 2, it can be determined that the ink includes a compound corresponding to the compound used in the present invention.

TABLE 2

| | Analysis Results | | | |
|---|---|---|---|---|
| | Retention Time | Maximum Absorption Wavelength | M/Z | |
| | [minutes] | [nm] | posi | nega |
| Exemplified Compound 5 | 31.0 to 32.0 | 440 to 460 | 937 to 940 | 935 to 938 |
| Exemplified Compound 16 | 30.0 to 31.0 | 390 to 410 | 922 to 925 | 920 to 923 |

[Content of a Coloring Material]

The content (% by mass) of the first coloring material (compound represented by general formula (I) or general formula (II)) in ink is preferably from 0.1% by mass to 10.0% by mass based on the total mass of the ink. Further, the content (% by mass) of the second coloring material (compound represented by general formula (III) or general formula (IV)) in ink is preferably from 0.1% by mass to 10.0% by mass based on the total mass of the ink.

Furthermore, the sum of the contents (% by mass) of the first coloring material and the second coloring material in ink is preferably from 1.0% by mass to 10.0% by mass based on the total mass of the ink. The sum of these contents (% by mass) is especially preferably from 1.5% by mass to 6.0% by mass. If the sum of these contents is less than 1.0% by mass, sufficient lightfastness and color developabilities may not be obtained, while if the sum of these contents exceeds 10% by mass ink jet characteristics such as resistance to sticking may not be obtained.

Based on the total mass of the ink, the content of the first coloring material (% by mass) to the content of the second coloring material (% by mass) is preferably, in terms of mass ratio, (first coloring material/second coloring material)=0.1 times to 10.0 times. More specifically, this is preferably {content of the compound of the general formula (I) or the general formula (II)/content of the compound of the general formula (III) or the general formula (IV)}=0.1 times to 10.0 times. By setting the mass ratio of the contents in the above range, lightfastness, color developabilities, color tone of an image and storage stability of an ink can be especially effectively obtained. In the present invention, {content of the compound of the general formula (I) or the general formula (II)/content of the compound of the general formula (III) or the general formula (IV)}1.0 time to 5.0 times is more preferred. By setting the content mass ratios in the above range, high-level lightfastness can be obtained which far exceeds the performance predicted from the combination of the lightfastness of the compound of the general formula (I) or the general formula (II) and the lightfastness of the compound of the general formula (III) or the general formula (IV).

The reason why a synergistic effect is expressed by using the above-described first coloring material and second coloring material in a specific mass ratio, whereby lightfastness exceeding the predictions is obtained is not clear, although the present inventors conject the following. The compound of general formula (I) or general formula (II) originally has low solubility. Thus, when an ink containing such compounds is provided onto a recording medium, association or aggregation of the coloring material rapidly occurs immediately thereafter. The association or aggregation tends to improve the image robustness of the coloring material on the recording medium forming the image. On the other hand, excessive association or aggregation may cause the lightfastness ability originally had by the molecular structure to deteriorate. In contrast, by making a compound such as that of the general formula (III) or the general formula (IV) co-exist, the compound of general formula (I) or general formula (II) on the recording medium is formed in an optimal association or aggregation state for lightfastness, whereby it is thought that lightfastness improves.

Note that when the ink jet ink of the present invention is yellow ink, the preferred color tone as yellow ink means the following two points. Specifically, that an image formed using only yellow ink does not suffer from a red tinge or a green tinge. Further, in addition to this, having a color tone in which neither the color gamut in the red region or the green region is greatly lost for an image of a secondary color formed using yellow ink, namely, when an image is formed in the red region or the green region. More specifically, the hue angle of an image formed using only yellow ink is preferably 85 to 92°, and more preferably 88 to 90°.

[pH Buffering Ability]

The term "pH buffering ability" in the present invention means that pH does not rise above a certain hydrogen ion concentration even if a certain level of acid is added. Further, "coloring material having a pH buffering ability" means a coloring material which prevents pH from rising above a certain hydrogen ion concentration even if a certain level of acid is added to a liquid (ink) containing the coloring material. Specifically, the term "coloring material having a pH buffering ability" in the present invention is defined as a coloring material having a pH of 7.0 or higher when 30 µL of a 2.8 N aqueous solution of nitric acid is charged into 20 mL of an aqueous solution containing 50 mmol/L of the coloring material. For example, exemplified compound 16 satisfies these conditions, and thus is considered as a coloring material having the pH buffering ability of the present invention. Further, whether a coloring material has a pH buffering ability for a coloring material contained in an unknown ink, can be verified in the following manner, for example. First, the coloring material is separated from the ink by preparative chromatography, and the molecular weight of the obtained coloring material can be measured using a high performance liquid chromatography mass spectrometer or the like. Subsequently, whether the coloring material has a pH buffering ability can be confirmed in the same manner as described above.

As a result of detailed investigations carried out by the present inventors, the following knowledge was obtained concerning the ink containing the above-described coloring material having a pH buffering ability and a compound of the general formula (I) or a compound of the general formula (II). Specifically, it was learned that an ink containing a combination of these coloring materials does not easily change pH even if stored for a long duration, and also that deposition of a compound of the general formula (I) or a compound of the general formula (II) is suppressed. This is believed to be due to the coloring material which has a pH buffering ability (second coloring material) acting as a buffer agent, whereby change in the ink pH is suppressed.

(pH of Ink)

The ink according to the present invention preferably has a pH of 7.0 to 10.0. This is because if the ink pH exceeds 10.0, the following problems can occur on the materials which constitute the parts of the ink cartridge and ink jet recording apparatus which are in contact with the ink, depending on the kind of material of these parts. Specifically, impurities from a portion in contact with the ink may dissolve in the ink, whereby the ink performance can deteriorate. Further, the materials constituting the parts which are in contact with the ink may degrade. In addition, when recording continuously for a long duration, degradation (dissolving) of the heating portion surface in contact with liquid of the recording head and disconnection of the wiring may occur. On the other hand, if the ink pH is less than 7.0, the solubility of a compound of the general formula (I) or a compound of the general formula (II) deteriorates, whereby the storage stability of the ink may deteriorate.

(Aqueous Medium)

One of water and an aqueous medium which is a mixed solvent of water and a water soluble organic solvent can be used in the ink of the present invention. Deionized water (ion exchange water) is preferably used as the water. The content (% by mass) of water in ink is preferably from 10.0% by mass or more to 90.0% by mass or less based on the total mass of the ink.

The water soluble organic solvent is not particularly limited as long as it is water soluble, and examples thereof include alcohols, polyhydric alcohols, polyglycols, glycol ethers, nitrogen-containing polar solvents and sulfur-containing polar solvents. The content (% by mass) of the water soluble organic solvent in ink is preferably from 5.0% by mass or more to 90.0% by mass or less, more preferably from 10.0% by mass or more to 50.0% by mass or less based on the total mass of the ink. When the content of the water soluble organic solvent is lower than the above described range, reliability such as ejection stability may not be obtained in the case of using the ink for an ink jet recording apparatus. On the other hand, when the content of the water soluble organic solvent is higher than the above described range, the viscosity of the ink may be increased to cause a poor ink supply.

Specific examples of the water soluble organic solvent include: alkyl alcohols having from 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; one of ketones and ketoalcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol and thiodiglycol; alkylene glycols in which an alkylene group has from 2 to 6 carbon atoms such as 1,5-pentanediol, 1,6-hexanediol, 2-methyl-1,3-propanediol, 3-methyl-1,5-pentanediol and 1,2,6-hexanetriol; bis(2-hydroxyethyl)sulfone; lower alkyl ether acetates such as polyethylene glycol monomethyl ether acetate; polyhydric alcohol alkyl ethers such as ethylene glycol monomethyl ether, ethylene glycol monoethyl ether, diethylene glycol methyl ether, diethylene glycol ethyl ether, triethylene glycol monomethyl ether and triethylene glycol mono ethyl ether; N-methyl-2-pyrrolidone, 2-pyrrolidone and 1,3-dimethyl-2-imidazolidinone. Of course, the present invention is not limited to these. These water soluble organic solvents can be used individually or in combination as required.

(Other Additives)

The ink of the present invention may contain a water-soluble organic compound which is solid at ordinary temperature such as polyhydric alcohols including trimethylolpropane and trimethylolethane, and urea derivatives including ethylene urea, besides the above-described components, if required. Further, the ink of the present invention may contain various additives such as a surfactant, a pH adjuster, a rust-inhibitor, antiseptics, an antifungal agent, an antioxidant, a reduction preventive, an evaporation accelerator, a chelating agent and a water-soluble polymer, as required.

<Other Inks>

Further, in order to form full color images, the ink of the present invention can be used in combination with an ink having a color tone different from the color tone of the ink of the present invention. The ink of the present invention is preferably used in combination with, for example, at least any one ink selected from the group consisting of black ink, cyan ink, magenta ink, yellow ink, red ink, green ink and blue ink. Furthermore, a so-called light ink which has substantially the same color tone as the color tone of these inks can also be used in combination. The coloring material for these inks or light inks may be a known coloring material or a newly synthesized coloring material.

<Recording Medium>

The recording medium to be used for forming images using the ink of the present invention may be any recording medium as long as it is a recording medium for recording by applying ink thereto. In the present invention, it is preferred to use a recording medium for ink jets in which coloring materials such as a dye and a pigment are allowed to adsorb to the particulates which form a porous structure of an ink receiving layer. It is particularly preferred to use a recording medium having a so-called void-absorbing type ink receiving layer which absorbs ink by the voids formed in the ink receiving layer on a support. The void-absorbing type ink receiving layer essentially includes particulates and may further include a binder and other additives as required.

Specifically, the followings can be used for the particulates: inorganic pigments such as silica, clay, talc, calcium carbonate, kaolin, aluminum oxide such as alumina and hydrated alumina, diatomaceous earth, titanium oxide, hydrotalcite and zinc oxide; and organic pigments such as a urea formalin resin, an ethylene resin and a styrene resin. These particulates can be used individually or in combination as required.

The binder includes a water soluble polymer and latex, and specific examples thereof include the followings: polyvinyl alcohol, starch, gelatin and modified body thereof; gum arabic; cellulose derivatives such as carboxymethylcellulose, hydroxyethylcellulose and hydroxypropylmethylcellulose; vinyl copolymer latex such as SBR latex, NBR latex, methyl methacrylate-butadiene copolymer latex, functional group-modified polymer latex and an ethylene-vinyl acetate copolymer; polyvinyl pyrrolidone; and maleic anhydride and a copolymer thereof and an acrylate copolymer. These binders can be used individually or in combination as required.

In addition, additives can be used as required. Examples of the additives include a dispersant, a thickener, a pH adjuster, a lubricant, a fluidity modifier, a surfactant, a defoaming agent, a release agent, a fluorescent brightener, an ultraviolet absorber, an antioxidant and a dye fixing agent.

In particular, in forming an image using the ink of the present invention, it is preferred to use a recording medium in which an ink receiving layer is formed by using particulates having an average particle size of not more than 1 μm. Specific examples of the particulates include silica particulates and aluminum oxide particulates. Preferred silica particulates include those typified by colloidal silica. Commercially available colloidal silica can be used, but it is particularly preferred to use, for example, colloidal silica described in Japanese Patent Nos. 2803134 and 2881847. Preferred aluminum oxide particulates include hydrated alumina particulates (an alumina pigment).

Among the above alumina pigment, hydrated alumina such as pseudoboehmite represented by the following formula can be particularly mentioned as a suitable one:

wherein n is an integer of 1 to 3; and m is 0 to 10, preferably 0 to 5, provided that m and n are not simultaneously 0.

In many cases, $mH_2O$ also represents an eliminable aqueous phase which does not participate in the formation of $mH_2O$ crystal lattices. For this reason, m may take one of an integer and a value which is not an integer. Further, when this type of hydrated alumina is heated, m may reach 0.

The hydrated alumina can be produced by the following known methods. For example, it can be produced by hydrolysis of an aluminum alkoxide and sodium aluminate as disclosed in U.S. Pat. No. 4,242,271 and U.S. Pat. No. 4,202,870. Further, it can be produced by a method in which an aqueous solution of one of sodium sulfate and aluminum chloride is added to an aqueous solution of sodium aluminate to effect neutralization as disclosed in Japanese Patent Application Laid-Open No. S57-044605.

The recording medium preferably has a support for supporting the above-described ink receiving layer. Any material may be used for the support without any limitation as long as the material allows the ink receiving layer to be formed from the above-described porous particulates and forms a support which is rigid enough to be transported by a transport mechanism of an ink jet recording apparatus. For example, a paper support including a pulp raw material which essentially includes natural cellulose fibers can be used. A plastic support including a material such as polyester (for example, polyethylene terephthalate), cellulose triacetate, polycarbonate, polyvinyl chloride, polypropylene and polyimide can also be used. A resin-coated paper (example: RC paper) having a polyolefin resin coating layer, to which a white pigment is added, on at least one side of a base paper can also be used.

<Ink Jet Recording Method>

The ink of the present invention is particularly preferably used for the ink jet recording method in which ink is ejected by an ink jet system to perform recording on a recording medium. The ink jet recording method includes a recording method in which ink is ejected by applying mechanical energy on the ink and a recording method in which ink is ejected by applying thermal energy on the ink. In particular, in the present invention, the ink jet recording method using thermal energy can be preferably used.

<Ink Cartridge>

A suitable ink cartridge for recording by using the ink of the present invention includes an ink cartridge provided with an ink storage portion for storing ink.

<Recording Unit>

A suitable recording unit for recording using the ink of the present invention includes a recording unit provided with an ink storage portion for storing the ink and a recording head for ejecting the ink. In particular, a recording unit can be preferably used in which the above recording head ejects the ink by applying thermal energy corresponding to a recording signal to the ink. In particular, a recording head having a heating portion surface in contact with liquid including at least one of metals and metal oxides is preferably used in the present invention. Specific examples of at least one of the metals and the metal oxides constituting the above heating portion surface in contact with liquid include metal such as Ta, Zr, Ti, Ni and AT, and metal oxides thereof.

<Ink Jet Recording Apparatus>

A suitable ink jet recording apparatus using the ink of the present invention includes an ink jet recording apparatus provided with an ink storage portion for storing the ink and a recording head for ejecting the ink. In particular, an ink jet recording apparatus can be mentioned in which the ink in the recording head having an ink storage portion for storing the ink is ejected by applying thermal energy corresponding to a recording signal to the ink.

A schematic constitution of a mechanism portion of an ink jet recording apparatus will be described below. An ink jet recording apparatus has a sheet feeding portion, a sheet conveying portion, a carriage portion, a sheet discharge portion, a cleaning portion and an external packaging portion for protecting the above portions and providing them with a design, each of which plays a role of each mechanism.

Figure 2:
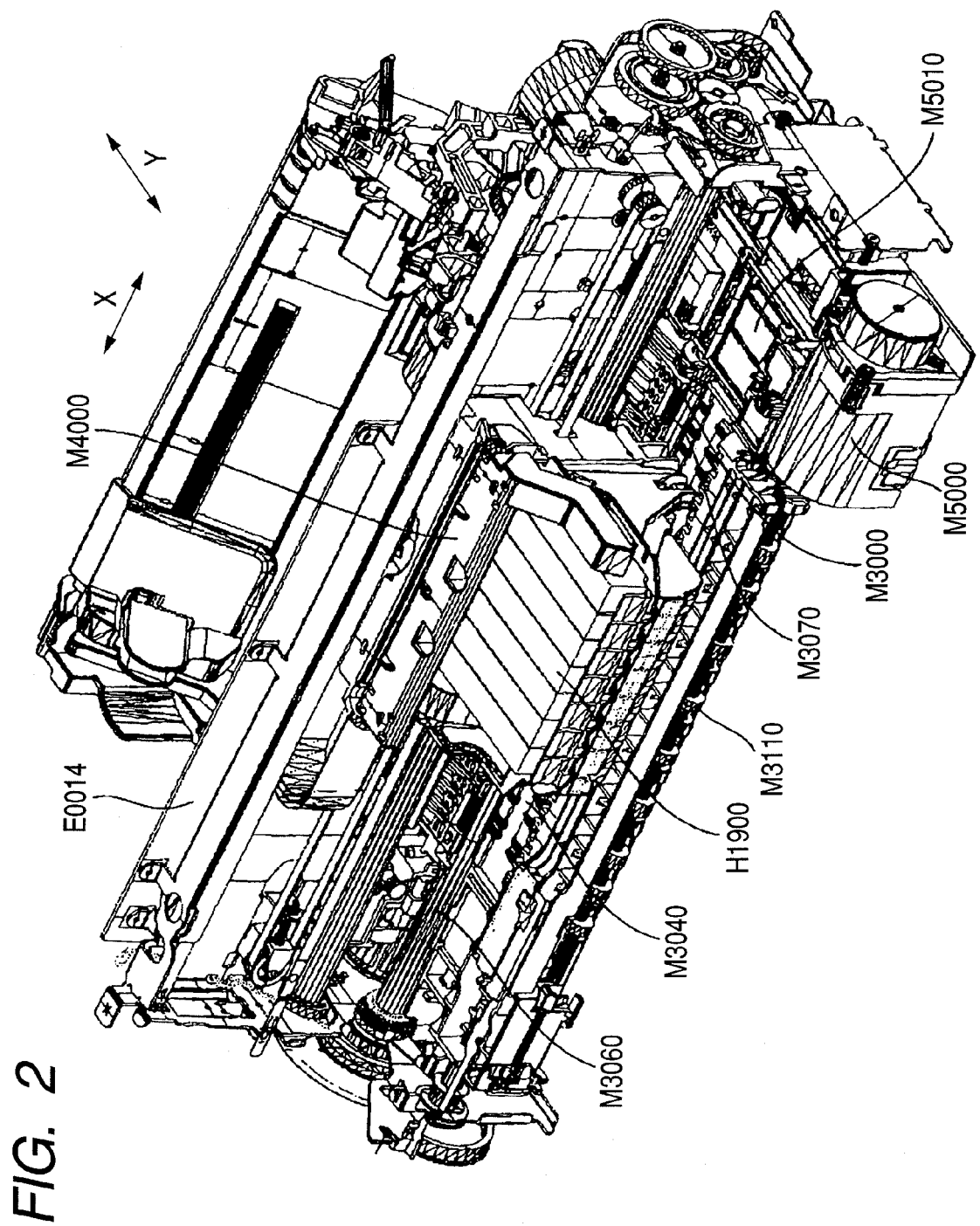
FIG. 2 is a perspective view of a mechanism portion of an ink jet recording apparatus.
Figure 3:
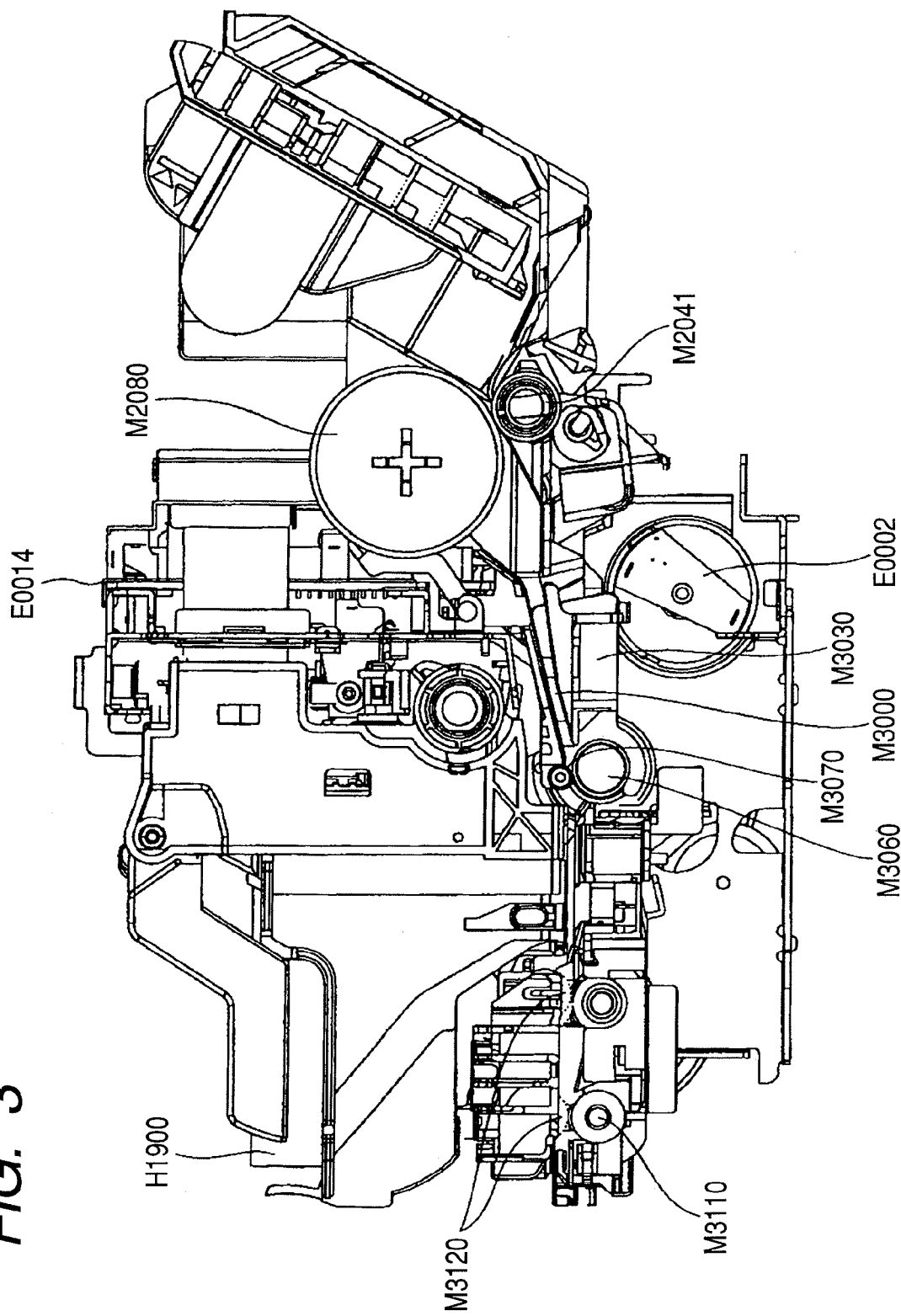
FIG. 3 is a sectional view of an ink jet recording apparatus.

FIG. 1 is a perspective view of an ink jet recording apparatus. FIGS. 2 and 3 are view for describing the internal mechanism of an ink jet recording apparatus, wherein FIG. 2 illustrates a perspective view seen from an upper right portion, and FIG. 3 illustrates the sectional side elevation of the ink jet recording apparatus.

When sheets are fed into the recording apparatus, only a specified number of recording media is sent to a nip portion comprising a sheet feeding roller M2080 and a separating roller M2041 in the sheet feeding portion including a sheet feeding tray M2060. The sent recording media are separated at the nip portion, and only the uppermost recording medium is conveyed. The recording medium conveyed to the sheet conveying portion is guided by a pinch roller holder M3000 and a paper guide flapper M3030 to be sent to a roller pair comprising a conveying roller M3060 and a pinch roller M3070. The roller pair comprising the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4: details about the constitution will be described later) is arranged at a target image forming position, and ink is ejected to the recording medium according to a signal from an electrical substrate E0014. While recording is performed by the recording head H1011, main scanning in which a carriage M4000 scans in the column direction and sub scanning in which a recording medium is conveyed in the row direction by the conveying roller M3060 are alternately repeated, whereby an image is formed on the recording medium. Finally, the recording medium on which an image has been formed is pinched at a nip between a first sheet discharge roller M3110 and a spur M3120 in the sheet discharge portion, conveyed, and discharged to a sheet discharge tray M3160.

The cleaning portion cleans the recording head H1001 before and after forming an image. A pump MS000 is operated while capping the ejection orifice of the recording head H1O01 with a cap M5010 so that unnecessary ink is sucked from the ejection orifice of the recording head H1001. Further, the ink remaining in the inside of the cap M5010 is sucked with the cap M5010 opened so as to prevent sticking and other harmful effects by the residual ink.

(Constitution of Recording Head)

Figure 4:
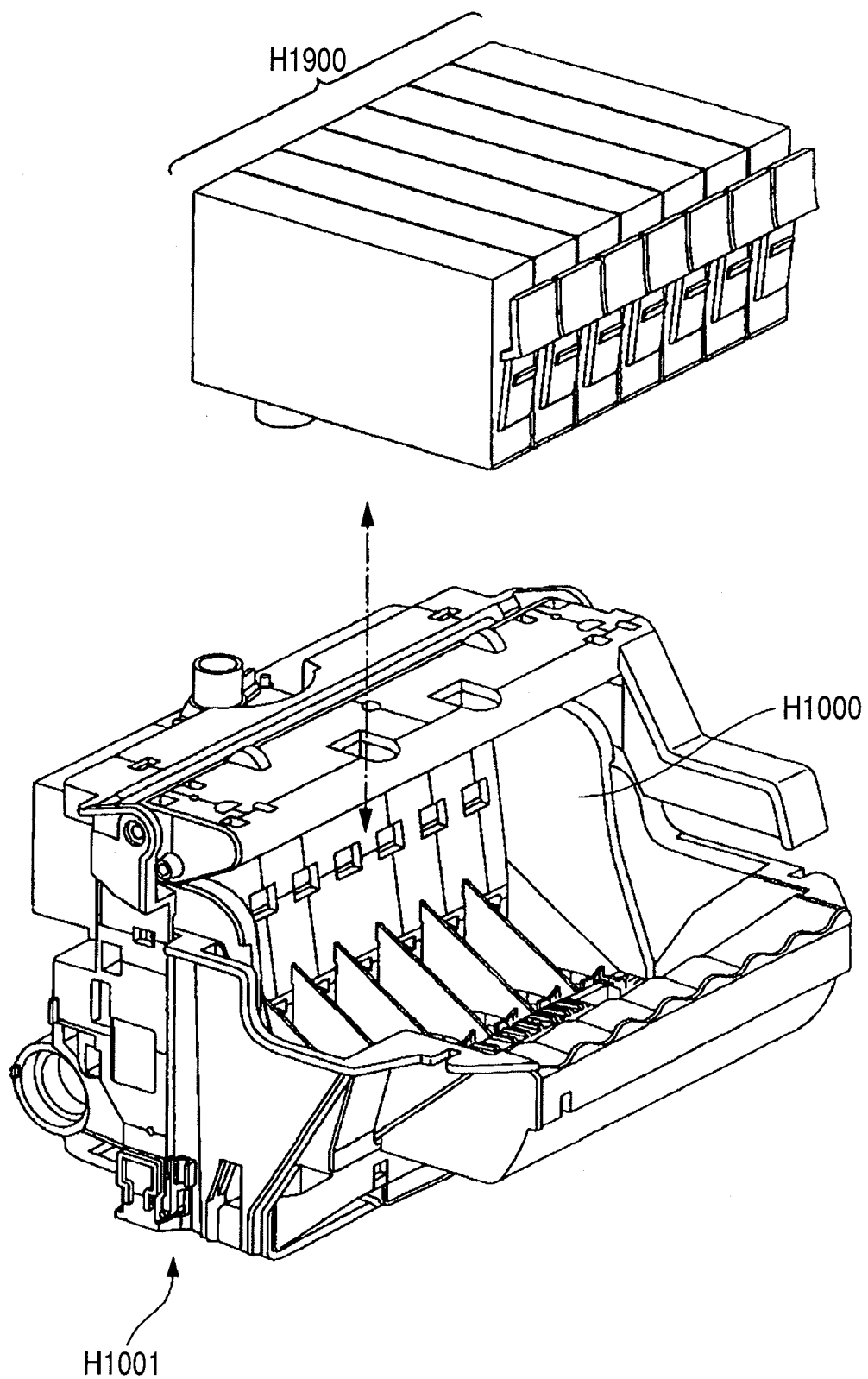
FIG. 4 is a perspective view illustrating the state of mounting an ink cartridge on a head cartridge.

The constitution of a head cartridge H1000 is described. FIG. 4 is a view illustrating the constitution of a head cartridge H1000 and how the ink cartridge H1900 is mounted on the head cartridge H1000. The head cartridge H1000 has a recording head H1001, a unit to mount an ink cartridge H1900 and a unit to supply ink to the recording head from the ink cartridge H1900, and is detachably mounted on a carriage M4000.

The ink jet recording apparatus forms images with yellow, magenta, cyan, black, light magenta, light cyan and green inks. Therefore, the ink cartridges H1900 are independently prepared for seven colors. Note that, the ink of the present invention is used for at least one of the above inks. In addition, as illustrated in FIG. 4, each ink cartridge H1900 is detachable relative to the head cartridge H1000. The ink cartridge H1900 can also be attached and detached in such a state that the head cartridge H1000 is mounted on the carriage M4000.

Figure 5:
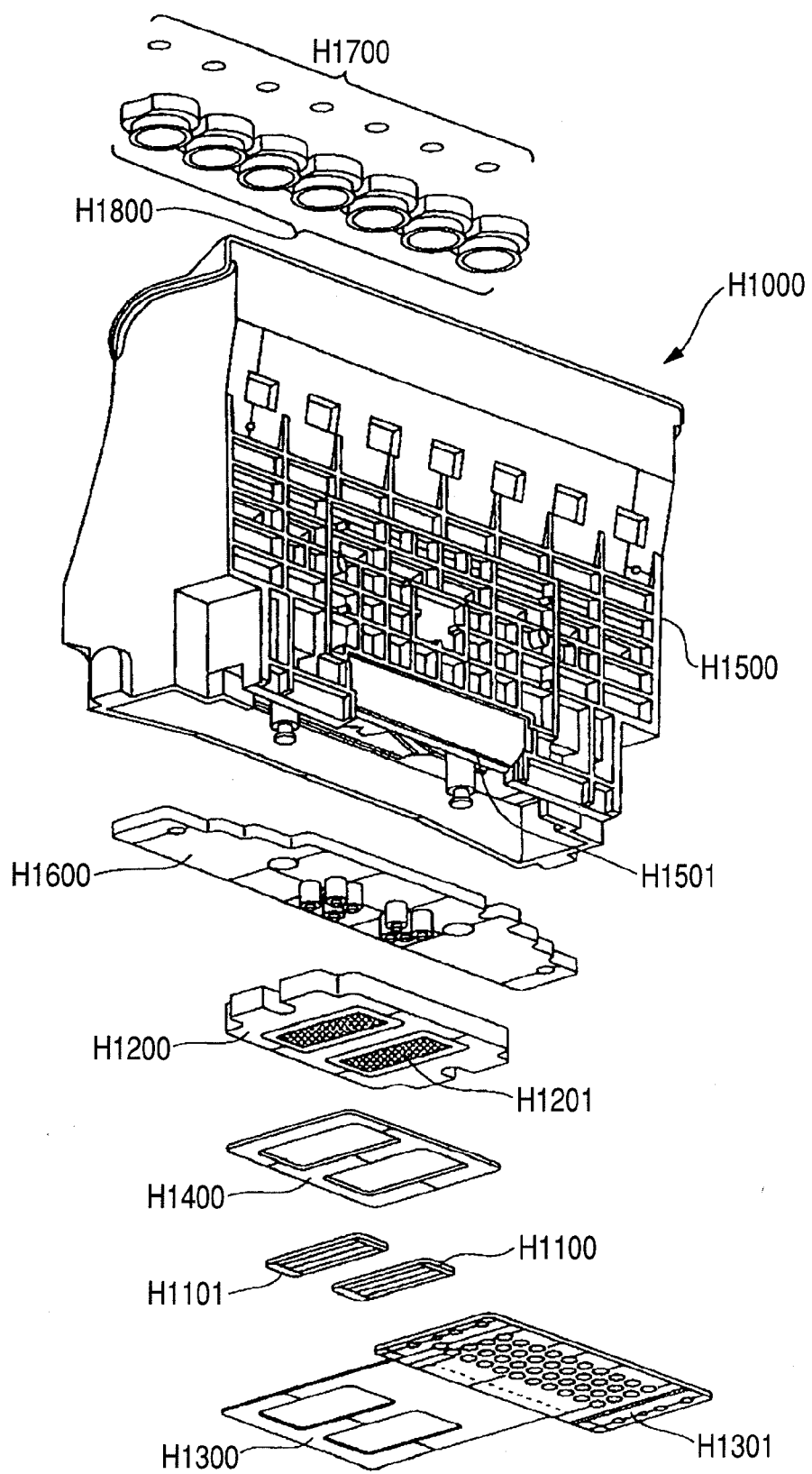
FIG. 5 is an exploded perspective view of a head cartridge.

FIG. 5 is an exploded perspective view of the head cartridge H1000. The head cartridge H1000 comprises a recording element substrate, a plate, an electrical wiring substrate H1800, a cartridge holder H1500, a flow path forming member H1600, a filter H1700 and a seal rubber H1800. The recording element substrate comprises a first recording element substrate H1100 and a second recording element substrate H1101, and the plate comprises a first plate H1200 and a second plate H1400.

Each of the first recording element substrate H4100 and the second recording element substrate H1101 is a Si substrate, and a plurality of recording elements (nozzles) for ejecting ink is formed on one side thereof by means of photolithography. Electrical wiring made of Al etc. to supply electric power to each recording element is formed by means of a film forming technique, and a plurality of ink flow paths corresponding to the individual recording elements is formed by photolithography. Further, ink supply ports for supplying ink to the plurality of ink flow paths are formed so as to be open on the rear surface.

Figure 6:
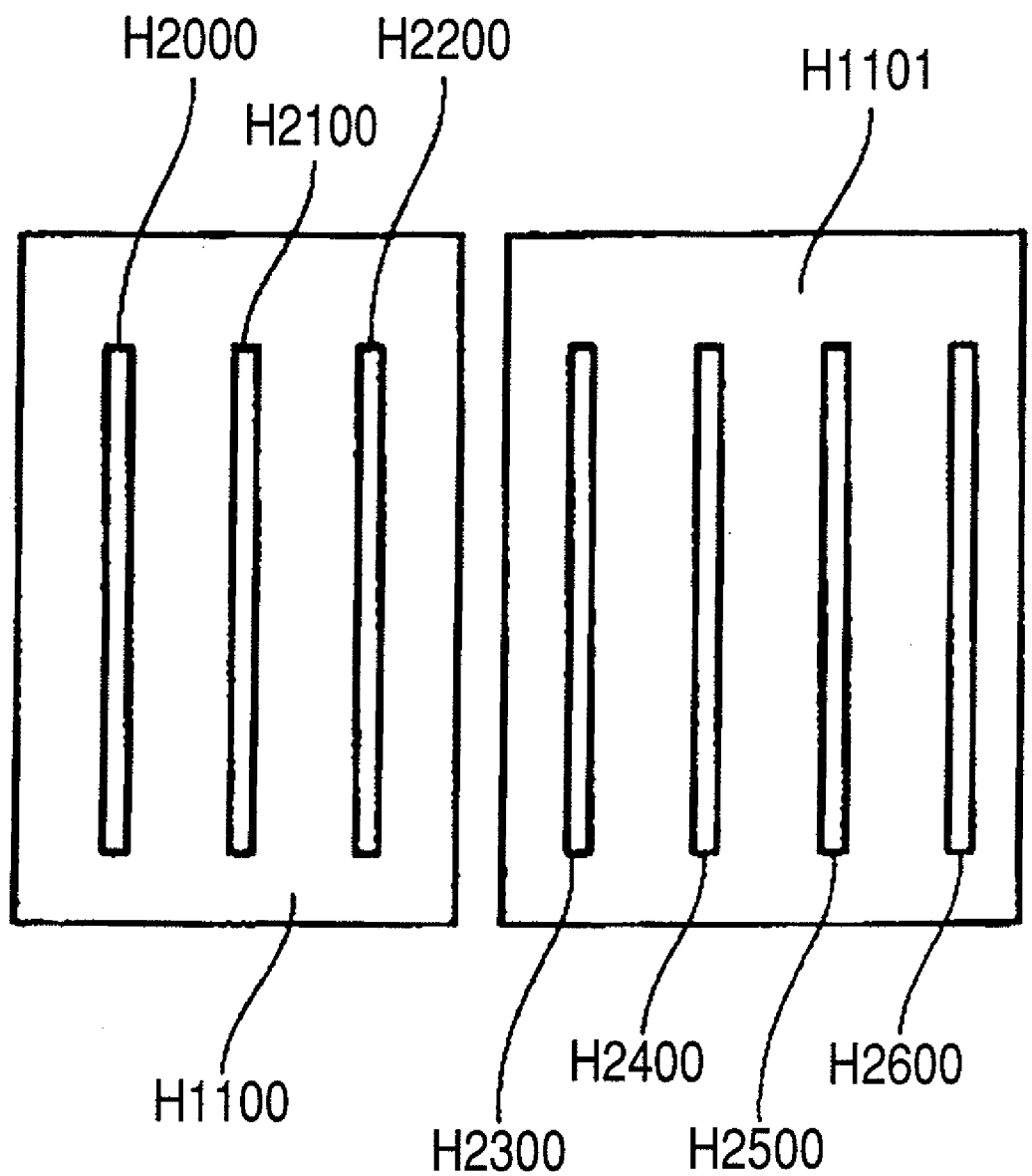
FIG. 6 is a front view illustrating a recording element substrate in a head cartridge.

FIG. 6 is an enlarged front view for describing the constitution of the first recording element substrate H1100 and the second recording element substrate H1101, which illustrates recording element trains H2000 to H2600 (hereinafter also referred to as nozzle trains) corresponding to different ink colors. The first recording element substrate H1100 has nozzle trains for three colors: a nozzle train H2000 for yellow ink, a nozzle train H2100 for magenta ink and a nozzle train H2200 for cyan ink. The second recording element substrate H1101 has nozzle trains for four colors: a nozzle train H2300 for light cyan ink, a nozzle train H2400 of black ink, a nozzle train H2500 for green ink and a nozzle train H2600 of light magenta ink.

Each nozzle train comprises 768 nozzles arranged at intervals of 1,200 dpi (dot/inch; reference value) in the conveying direction of a recording medium, and each nozzle ejects about 2 picoliter of ink. An opening area in each nozzle ejection orifice is set to be about 100 μm².

Hereinafter, the present invention will be described with reference to FIGS. 4 and 5. The first recording element substrate H1100 and the second recording element substrate H1101 are bonded and fixed to the first plate H1200, on which are formed ink supply ports H1201 for supplying ink to the first recording element substrate H1100 and the second recording element substrate H1101. The second plate H1400 having openings is also bonded and fixed to the first plate H1200. The second plate H1400 holds the electrical wiring substrate H1300 in such a manner that the electrical wiring substrate H1300, the first recording element substrate H1100 and the second recording element substrate H1101 are electrically connected.

The electrical wiring substrate H1300 applies electrical signals for causing each of the nozzles formed on the first recording element substrate H1100 and the second recording element substrate H1101 to eject ink. The electrical wiring substrate H1300 has: electrical wiring corresponding to each of the first recording element substrate H1100 and the second recording element substrate H1101; and an external signal input terminal H1301 which is positioned at the end portion of the electrical wiring to receive electrical signals from the ink jet recording apparatus. The external signal input terminal H1301 is positioned and fixed to the back surface side of the cartridge holder H1500.

A flow path forming member H1600 is fixed to a cartridge holder H1500 for holding the ink cartridges H1900 by means of, for example, ultrasonic welding. Thus, an ink flow path H1501 passing from the ink cartridges H1900 to the first plate H1200 is formed. A filter H1700 is arranged at the end portion on the ink cartridge side of the ink flow path H1501 engaged with the ink cartridges H1900 so that the filter H1700 prevents dust from entering from the outside. A seal rubber H1800 is mounted on the portion at which the ink flow path H1501 is engaged with the ink cartridges H1900 to prevent ink from evaporating from this portion.

Furthermore, as described above, the head cartridge H1000 is made up by connecting the cartridge holder portion with the recording head portion H1001 by the use of an adhesive. The cartridge holder portion comprises the cartridge holder H1500, the flow path forming member H1600, the filter H1700 and the seal rubber H1800, and the recording head portion H1001 comprises the first recording element substrate H1100, the second recording element substrate H1101, the first plate H1200, the electrical wiring substrate H1300 and the second plate H1400.

Description has been made here by taking, as an embodiment of a recording head, a recording head according to a thermal ink jet method that performs recording by means of an electrothermal converter (recording element) for generating thermal energy for causing ink to generate film boiling according to an electrical signal. As for the representative structure and principle, it is preferred to use basic principles discussed in, for example, U.S. Pat. No. 4,723,129 and U.S. Pat. No. 4,740,796. The method is applicable to any one of a so-called on-demand type and a so-called continuous type.

In particular, the method is effective for the on-demand type because of the following reason. At least one driving signal which corresponds to recording information and causes a sudden increase in temperature exceeding nuclear boiling is applied to electrothermal converters arranged corresponding to a liquid flow path holding ink, thereby causing the electrothermal converter to generate thermal energy and causing the ink to generate film boiling. As a result, an air bubble in the ink can be formed so as to be in one-to-one correspondence with the driving signal. The growth and contraction of the air bubble eject the ink through an ejection orifice, thereby forming at least one droplet. The driving signal is more preferably of a pulse shape because the growth and contraction of an air bubble can be performed immediately and appropriately, and hence the ink can be ejected with excellent responsiveness.

The ink of the present invention can also be suitably used in an ink jet recording apparatus utilizing mechanical energy as described below. The ink jet recording apparatus in such a form comprises a nozzle forming substrate having a plurality of nozzles, a pressure generating element arranged so as to be opposite to the nozzles and comprising a piezoelectric material and a conductive material, and an ink filling the surroundings of the pressure generating element, in which the pressure generating element is displaced by an applied voltage to eject the ink from the nozzles.

The ink jet recording apparatus is not limited to such apparatuses as described above in which a recording head and an ink cartridge are separated, and may be one in which a recording head and an ink cartridge are unified so that they are unseparable. The ink cartridge may also be separably or unseparably unified with the recording head to be mounted on a carriage, or may be mounted on a fixing portion of the ink jet recording apparatus to supply ink to a recording head through an ink supply member such as a tube. Further, when the ink cartridge is provided with a constitution for applying a suitable negative pressure to the recording head, the following constitution may be adopted. That is, an absorber may be arranged in an ink storage portion of the ink cartridge, or the ink cartridge may have a flexible ink storage bag and a spring portion for applying bias in the direction of expanding the internal volume of the bag. Further, the recording apparatus may adopt a serial recording method as described above, or may be in the form of a line printer obtained by aligning recording elements over the range corresponding to the entire width of a recording medium.

EXAMPLES

Hereinafter, the present invention will be described in more detail with reference to Examples and Comparative Examples. However, the present invention is not limited to the following Examples unless Examples depart from the gist of the present invention. Unless otherwise specified, the term "part" of each ink component in Examples and Comparative examples represents "part by mass".

<Preparation of Coloring Materials>

[Synthesis of exemplified compound 5 and measurement of the property values]

Exemplified compound 5 (potassium salt) was synthesized according to the following synthesis flow and sequence.

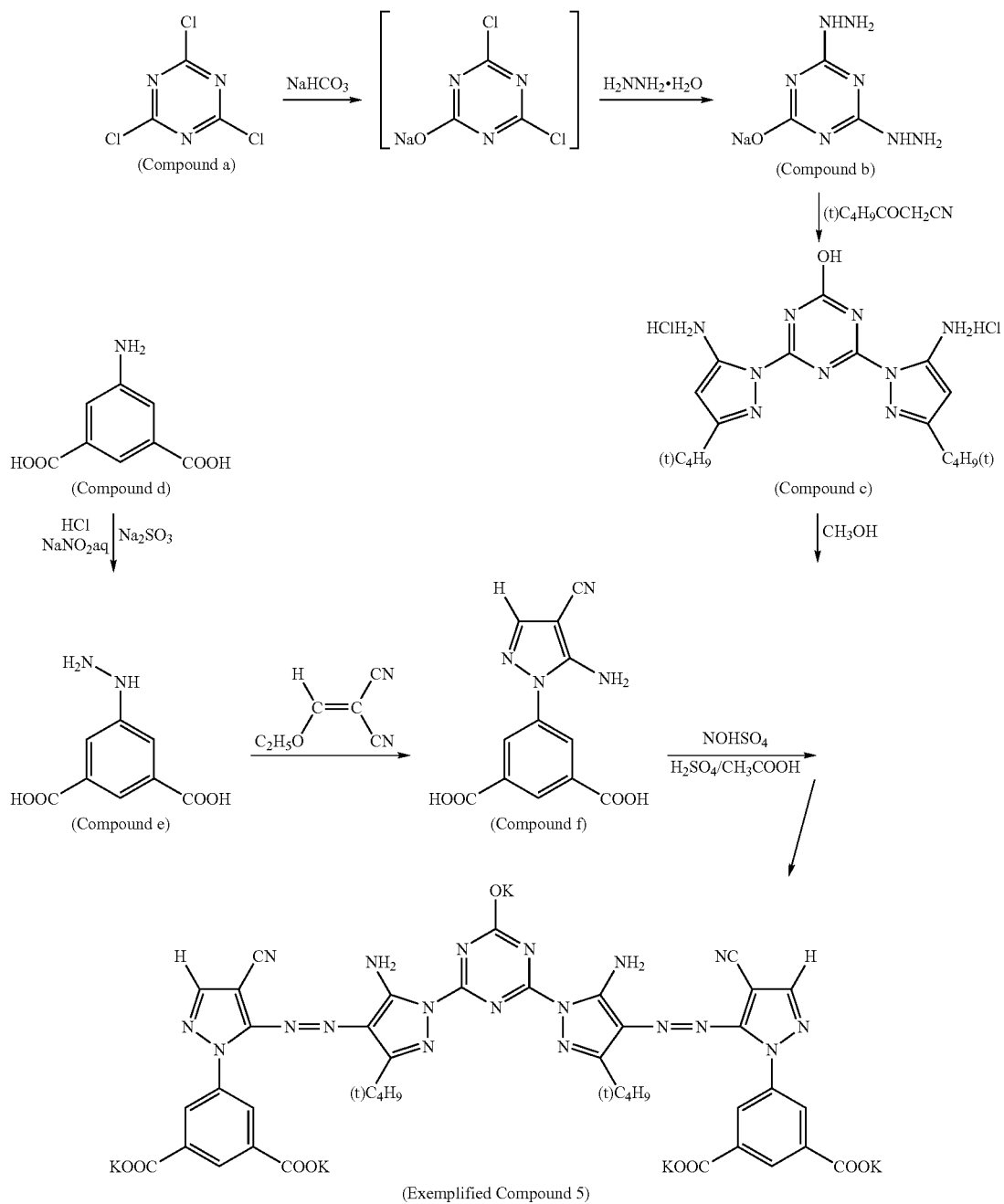

(Exemplified Compound 5)

(1) Synthesis of Compound b

Mixed together were 25.5 g of sodium bicarbonate and 150 mL of deionized water, and the resulting mixture was heated to 40° C. To the mixture was added 25.0 g of cyanuric chloride (manufactured by Tokyo Chemical Industry Co., Ltd.; compound a) every 10 minutes in 5 equal shares, and the resulting mixture was stirred for 1 hour to prepare a solution. The obtained solution was added dropwise to a mixture (8° C.) of 52.8 mL of hydrazine monohydrate and 47 mL of deionized water so that the internal temperature did not exceed 10° C. Then, the internal temperature was increased to 50° C., and the solution was stirred for 30 minutes. The deposited crystal was separated by filtration to obtain 23.4 g of compound b (hydrazine derivative, melting point >300° C.) The yield was 94.7%.

(2) Synthesis of Compound c

Suspended in 420 mL of ethylene glycol was 35.0 g of the above-obtained compound b (hydrazine derivative), and the resulting suspension was stirred at an internal temperature of 50° C. To the suspension were added 59 mL of concentrated hydrochloric acid and then 60.1 g of pivaloylacetonitrile (manufactured by Tokyo Chemical Industry Co., Ltd.) The mixture was stirred for 10 hours at 50° C., and then to the mixture were added 95 mL of concentrated hydrochloric acid and 145 mL of methanol. The mixture was stirred for another 8 hours. After leaving to cool to room temperature, the deposited crystal was separated by filtration to obtain 81.6 g of compound c (5-aminopyrazole derivative, melting point 233 to 235° C.) The yield was 94.2%.

(3) Synthesis of Compound e

Suspended in 500 mL of water was 90.57 g of compound d (manufactured by Tokyo Chemical Industry Co., Ltd.). To the resulting suspension was added 130 mL of concentrated hydrochloric acid. After the charging was finished, the resulting solution was cooled until the internal temperature reached 5° C. or below. Next, 70 mL of an aqueous solution containing 36.23 g of sodium nitrite was added dropwise at an internal temperature range of 4 to 6° C., and then the resulting solution was stirred for 30 minutes at an internal temperature of 5° C. or below. Next, 159 g of sodium sulfite and 636 mL of water were added to the solution while maintaining the internal temperature at 20° C. or below. To the solution was further added 250 mL of concentrated hydrochloric acid at an internal temperature of 25° C. The solution was stirred for 1 hour at an internal temperature of 90° C., and after cooling the internal temperature to room temperature, the solution was filtrated. The resulting product was washed with 200 mL of water and then dried to obtain 80.0 g of compound e.

(4) Synthesis of Compound f

Suspended in 209 mL of ethanol was 23.3 g of the above-obtained compound e, and 28 mL of triethylamine was added dropwise to the resulting suspension at room temperature. Then, 12.2 g of ethoxymethylenemalononitrile (manufactured by Aldrich) was added to the solution in several batches. The solution was refluxed for 3 hours, and then cooled to room temperature. The solution was then filtrated. The resulting product was washed with 400 mL of isopropyl alcohol and then dried to obtain 23.57 g of compound f.

(5) Synthesis of Exemplified Compound 5

To 32.4 mL of sulfuric acid was added 145.56 mL of acetic acid at an internal temperature of 4° C. or below, and then 15.9 mL of 40% by mass nitrosylsulfuric acid (manufactured by Aldrich) was added dropwise under stirring at an internal temperature of 7° C. or below. Then, 32.4 g of the above-obtained compound f was added to the solution in several batches. The solution was stirred for 60 minutes at an internal temperature of 10° C. Then, a diazonium salt of compound f was added dropwise at an internal temperature of less than 0° C. to a solution in which 18.8 g of compound c, to which 1.83 g of urea had been added, was suspended in 470 mL of methanol, and the resulting solution was stirred for 30 minutes at an internal temperature of less than 0° C. The temperature of this reaction solution was then increased to room temperature, and the solution was filtrated. The resulting product was washed with methanol and then with water to obtain a crude crystal. The obtained crude crystal was suspended in 400 mL of methanol, and the resulting suspension was stirred for 60 minutes under reflux. The temperature of this solution was then cooled to room temperature. The solution was filtrated, and the resulting product was washed respectively with methanol, water and methanol, in that order, and dried overnight at 75° C. to obtain 34.4 g of a free acid crystal of exemplified compound 5. The obtained crystal was dissolved in water to produce a 10% by mass aqueous solution (25° C.: pH≈8.3: modified with an aqueous solution of KOH). To this solution was added isopropanol alcohol at an internal temperature of 50° C. and crystallized. The crystallized product was cooled, filtrated and then washed with isopropanol alcohol and dried. As a result, 35.0 g of exemplified compound 5 (potassium salt) was obtained.

(6) Measurement of the Property Values of Exemplified Compound 5

The in-water λmax value and ε value of the above-obtained exemplified compound 5 were measured. The results are shown in Table 3. Absorbance was measured under the following conditions.

Spectrophotometer: Self-recording spectrophotometer (Model name: U-3300; manufactured by Hitachi Ltd.)

Measurement cell: 1 cm quartz cell

Sampling interval: 0.1 nm

Scan rate: 30 nm/min

[Synthesis of Exemplified Compound 2 and Measurement of the Property Values]

Exemplified compound 2 was synthesized in the same manner as the above-described synthesis flow of exemplified compound 5, except that compound d in the synthesis flow of exemplified compound 5 was changed to 2-amino-1,4-benzenedisulfonic acid. The in-water λmax value and ε value of the obtained exemplified compound 2 are shown in Table 3. The absorbance measurement conditions were the same as for exemplified compound 5.

[Synthesis of Exemplified Compound 3 and Measurement of the Property Values]

Exemplified compound 3 was synthesized in the same manner as the above-described synthesis flow of exemplified compound 5, except that compound d in the synthesis flow of exemplified compound 5 was changed to 5-amino-1,3-benzenedisulfonic acid. The in-water λmax value and ε value of the obtained exemplified compound 3 are shown in Table 3. The absorbance measurement conditions were the same as for exemplified compound 5.

[Synthesis of Exemplified Compound 6 and Measurement of the Property Values]

Exemplified compound 6 was synthesized in the same manner as the above-described synthesis flow of exemplified compound 5, except that the ethoxymethylenemalononitrile used during the synthesis of compound f in the synthesis flow of exemplified compound 5 was changed to 2-(1-ethoxyethylidene)malononitrile. The in-water λmax value and ε value of exemplified compound 6 are shown in Table 3. The absorbance measurement conditions were the same as for exemplified compound 5.

[Synthesis of Exemplified Compound 7 and Measurement of the Property Values]

5-Amino-3-tert-butylpyrazole-4-carbonitrile synthesized by an ordinary method was diazotized using sodium nitrite under acidic conditions. The obtained compound was coupled with compound c in the synthesis flow of exemplified compound 5. The obtained compound was dissolved in dimethylacetamide, and to the resulting solution was added 5-chloroisophthalic acid. Potassium carbonate was then added to the solution, which was then stirred at an internal temperature of 150° C. The internal temperature of the reaction solution was then cooled to room temperature. The solution was filtrated and then washed in the same order as in the synthesis flow of exemplified compound 5, whereby exemplified compound 7 was synthesized. The in-water λmax value and ε value of exemplified compound 7 are shown in Table 3. The absorbance measurement conditions were the same as for exemplified compound 5.

TABLE 3

λmax Value and ε Value in Water

| | λmax [nm] | ε [dm³·cm/mol] |
|---|---|---|
| Exemplified Compound 2 | 444.6 | $3.76 \times 10^4$ |
| Exemplified Compound 3 | 442.6 | $3.44 \times 10^4$ |
| Exemplified Compound 5 | 436.4 | $3.53 \times 10^4$ |
| Exemplified Compound 6 | 434.3 | $3.50 \times 10^4$ |
| Exemplified Compound 7 | 449.0 | $3.66 \times 10^4$ |

[Synthesis of Exemplified Compound 16 and Measurement of the Property Values]

(1) Synthesis of the Azo Compound Represented by Formula (a)

While adjusting to a pH of 6 with sodium hydroxide, 17.3 parts of 3-aminobenzenesulfonic acid was dissolved in 200 parts of water, and to the resulting solution was then added 7.2 parts of sodium nitrite. The temperature of this solution was adjusted to 0 to 10° C., and then the solution was added dropwise over 30 minutes to 300 parts of 5% hydrochloric acid. The solution was then stirred for 1 hour at 10° C. or below to carry out a diazotization reaction, whereby a diazonium salt was prepared.

Further, while adjusting to a pH of 5 with sodium hydroxide, 12.3 parts of 2-methoxyaniline was dissolved in 130 parts of water. Then, using 10.4 parts of sodium bisulfite and 8.6 parts of 35% formalin, a methyl-ω-sulfonic acid derivative was obtained by an ordinary method. The obtained methyl-ω-sulfonic acid derivative was added to the above-prepared diazonium salt, and the resulting solution was stirred for 5 hours at a temperature of 0 to 15° C. with a pH of 2 to 4. The obtained reaction solution was adjusted to a pH of 11 with sodium hydroxide, and then while maintaining the pH at 11, the solution was stirred for 5 hours at a temperature of 80 to 95° C. To the solution was added 100 parts of sodium chloride for salting-out. The deposited solid was filtrated to thereby obtain 100 parts of the azo compound represented by the following formula (a) as a wet cake.

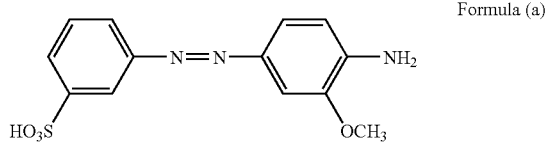

Formula (a)

(2) Synthesis of the Azo Compound Represented by Formula (b)

While adjusting to a pH of 6 with sodium hydroxide, 17.3 parts of 3-aminobenzenesulfonic acid was dissolved in 200 parts of water, and to the resulting solution was then added 7.2 parts of sodium nitrite. The temperature of this solution was adjusted to 0 to 10° C., and then the solution was added dropwise over 30 minutes to 300 parts of 5% hydrochloric acid. The solution was then stirred for 1 hour at 10° C. or below to carry out a diazotization reaction, whereby a diazonium salt was prepared.

Further, while adjusting to a pH of 5 with sodium hydroxide, 23.1 parts of 2-sulfopropoxyaniline was dissolved in 130 parts of water. Then, using 10.4 parts of sodium bisulfite and 8.6 parts of 35% formalin, a methyl-ω-sulfonic acid derivative was obtained by an ordinary method. The obtained methyl-ω-sulfonic acid derivative was added to the above-prepared diazonium salt, and the resulting solution was stirred for 5 hours at a temperature of 0 to 15° C. with a pH of 2 to 4. The obtained reaction solution was adjusted to a pH of 11 with sodium hydroxide, and then while maintaining the pH at 11, the solution was stirred for 5 hours at a temperature of 80 to 95° C. To the solution was added 100 parts of sodium chloride for salting-out. The deposited solid was filtrated to thereby obtain 130 parts of the azo compound represented by the following formula (b) as a wet cake.

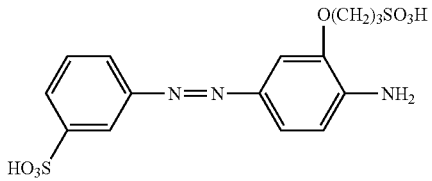

Formula (b)

(3) Synthesis of Exemplified Compound 16 and Measurement of the Property Values

Next, 0.10 parts of Leocol TD90 (trade name; manufactured by Lion Corporation, surfactant) was added to 250 parts of ice water, and the resulting solution was vigorously stirred. To the solution was added 8.0 parts of cyanuric chloride, and then stirred for 30 minutes at a temperature of 0 to 5° C. to obtain a suspension. 100 parts of a wet cake of the above-described azo compound represented by the formula (a) was dissolved in 200 parts of water, and the above-described suspension was added dropwise thereto over 30 minutes. Next, the resulting mixture was stirred for 6 hours at a temperature of 0 to 10° C. with a pH of 5 to 6 to obtain a solution. Then, 130 parts of a wet cake of the above-described azo compound represented by the formula (b) was dissolved in 300 parts of water, and the solution was added dropwise into the before-mentioned solution over 30 minutes. Next, the resulting mixture was stirred for 6 hours at a temperature of 25 to 35° C. with a pH of 6 to 7, and then 18.8 parts of taurine was added to the mixture which was then stirred for a further 3 hours at a temperature of 75 to 80° C. with a pH of 7 to 9 to obtain a reaction solution. The obtained reaction solution was cooled to a temperature of 20 to 25° C., and then 800 parts of acetone was added to the solution. The solution was stirred for 1 hour at a temperature of 20 to 25° C.; whereby a solid deposited. The deposited solid was filtrated to thereby obtain 95.0 parts of a wet cake. This wet cake was dried in a hot-air dryer at a temperature of 80° C. to obtain 30.0 parts of exemplified compound 16 (water-soluble azo compound). The thus obtained exemplified compound 16 had an in-water λmax value of 391 nm. The absorbance measurement conditions were the same as for exemplified compound 5.

[Synthesis of Exemplified Compound 50 and Measurement of the Property Values]

Diazotized 4-nitro-4'-aminostilbene-2,2-disulfonic acid was coupled with 3-aminonaphthalene-1-sulfonic acid. The obtained reaction product was triazotized, and then the nitro group was reduced to an amino group by a method known in the art to obtain an aminostilbene-triazole. This aminostilbene-triazole was dissolved in water, and sodium nitrite and hydrochloric acid were added dropwise thereto to carry out the diazotization. This was then added dropwise to an aqueous solution of the compound represented by the following formula (c), and that compound coupled with the diazotized compound. The resulting mixture was then salted-out with sodium chloride. The obtained compound was diazotized with an aqueous solution of sodium nitrite to obtain a turbid solution. To the turbid solution was added an aqueous solution of 6-aminonaphthalene-2-sulfonic acid. The resulting product was formed into a triazole compound which was then salted-out with sodium chloride, whereby exemplified compound 50 represented by the following structure was obtained.

Formula (c)

Exemplified Compound 50

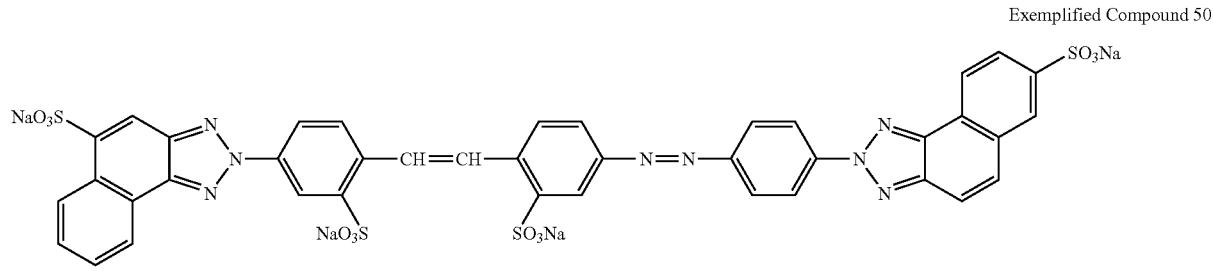

<pH Buffering Capability of the Coloring Material>

Using the respective coloring materials of the above-obtained exemplified compound 16 and exemplified compound 50, as well as C.I. Direct Yellow 132 and C.I. Direct Yellow 86, a 20 mL aqueous solution of 50 mmol/L of each of the coloring materials was prepared. The pH of each of the obtained respective aqueous solutions was measured. The pH of exemplified compound 16 was 7.58, the pH of exemplified compound 50 was 7.48, the pH of C.I. Direct Yellow 132 was 7.50 and the pH of C.I. Direct Yellow 86 was 8.30. Next, 2.8 N aqueous nitric acid was gradually added dropwise to each of the aqueous solutions, and the pH of the aqueous solutions was continually measured. When the pH of the aqueous solutions reached 7.0, the added amount of aqueous nitric acid was determined. As a result, the aqueous solution of exemplified compound 16 reached a pH of 7.0 after 35 μL of aqueous nitric acid had been added dropwise, and the aqueous solution of C.I. Direct Yellow 86 reached a pH of 7.0 after 40 μL of aqueous nitric acid had been added dropwise. Further, for both exemplified compound 50 and C.I. Direct Yellow 132, the aqueous had a pH of 4.0 or less after just a tiny amount (10 μL or less) of aqueous nitric acid had been added dropwise. From the above results, it was learned that exemplified compound 16 and C.I. Direct Yellow 86 were coloring materials which have a pH buffering capability. It is noted that in the pH measurement, the pH Meter F-21 (manufactured by Horiba Ltd.) was used, and the measurement was carried out at 25° C.

<Preparation of Ink>

Inks were respectively prepared in the following manner using the above-obtained exemplified compounds 2, 3, 5, 6, 7, 16 and 50, as well as C.I. Direct Yellow 132 and C.I. Direct Yellow 86, which are all yellow coloring materials. First, each of the components shown in Tables 4 and 5 below were mixed and sufficiently stirred. Then, the resulting mixture was filtered through a filter having a pore size of 0.2 μm under pressure to prepare the yellow inks of Examples 1 to 17 and Comparative Examples 1 to 17.

TABLE 4

| | Ink Composition (Unit: % by mass) | | | | | | | | | | | | | | | | |
|---|---|---|---|---|---|---|---|---|---|---|---|---|---|---|---|---|---|
| | Examples | | | | | | | | | | | | | | | | |
| | 1 | 2 | 3 | 4 | 5 | 6 | 7 | 8 | 9 | 10 | 11 | 12 | 13 | 14 | 15 | 16 | 17 |
| Exemplified Compound 2 | | | | | | | | | | 3.0 | 3.0 | | | | | | |
| Exemplified Compound 3 | | | | | | | | | | | | 3.0 | 3.0 | | | | |
| Exemplified Compound 5 | 5.0 | 5.1 | 5.0 | 3.0 | 2.0 | 2.7 | 1.0 | 3.0 | 1.0 | | | | | | | | |
| Exemplified Compound 6 | | | | | | | | | | | | | | 3.0 | 3.0 | | |
| Exemplified Compound 7 | | | | | | | | | | | | | | | | 3.0 | 3.0 |
| Exemplified Compound 16 | 0.8 | 1.0 | 1.0 | 1.0 | 2.0 | 3.0 | 2.0 | | | 1.0 | | 1.0 | | 1.0 | | 1.0 | |
| Exemplified Compound 50 | | | | | | | | | | | | | | | | | |
| C.I. Direct Yellow 132 | | | | | | | | | | | | | | | | | |

TABLE 4-continued

Ink Composition (Unit: % by mass)

Examples

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| C.I. Direct Yellow 86 | | | | | | | | 1.0 | 3.0 | | 1.0 | | 1.0 | | 1.0 | | 1.0 |
| Ethylene Glycol | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Diethylene Glycol | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Acetylenol E100 (*1) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Deionized Water | 75.2 | 74.9 | 75.0 | 77.0 | 77.0 | 75.3 | 78.0 | 77.0 | 77.0 | 77.0 | 77.0 | 77.0 | 77.0 | 77.0 | 77.0 | 77.0 | 77.0 |

(*1) Manufactured by Kawaken Fine Chemicals Co., Ltd.

TABLE 5

Ink Composition (Unit: % by mass)

Comparative Examples

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Exemplified Compound 2 | 4.0 | | | | | | | 3.0 | 3.0 | | | | | | | | |
| Exemplified Compound 3 | | 4.0 | | | | | | | | 3.0 | 3.0 | | | | | | |
| Exemplified Compound 5 | | | 4.0 | | | | | | | | | 30 | 3.0 | | | | |
| Exemplified Compound 6 | | | | 4.0 | | | | | | | | | | 3.0 | 3.0 | | |
| Exemplified Compound 7 | | | | | 4.0 | | | | | | | | | | | 3.0 | 3.0 |
| Exemplified Compound 16 | | | | | | 4.0 | | | | | | | | | | | |
| Exemplified Compound 50 | | | | | | | | 1.0 | | 1.0 | | 1.0 | | 1.0 | | 1.0 | |
| C.I. Direct Yellow 132 | | | | | | | | | 1.0 | | 1.0 | | 1.0 | | 1.0 | | 1.0 |
| C.I. Direct Yellow 86 | | | | | | | 4.0 | | | | | | | | | | |
| Ethylene Glycol | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Diethylene Glycol | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 | 9.0 |
| Acetylenol E100 (*1) | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Deionized Water | 77.0 | 77.0 | 77.0 | 77.0 | 77.0 | 77.0 | 77.0 | 77.0 | 77.0 | 77.0 | 77.0 | 77.0 | 77.0 | 77.0 | 77.0 | 77.0 | 77.0 |

(*1) Manufactured by Kawaken Fine Chemicals Co., Ltd.

(Evaluation)

(1) Lightfastness

Each of above-obtained inks was loaded into the ink jet recording apparatus (trade name: PIXUS iP8600) using thermal energy. Recording conditions were set to a temperature of 23° C., a relative humidity of 55%, a recording density of 2,400 dpi×1,200 dpi and an ejection of 2.5 pL. Here, the recording medium to be used during the production of the recorded matter was produced in the following manner. First, a resin composition containing 70 parts of low density polyethylene, 20 parts of high density polyethylene and 10 parts of titanium oxide was applied to both sides of a base paper with a basis weight of 155 g/m² so that the composition is applied in an amount of 25 g/m² to thereby produce a support covered with the resin. Then, an ink receiving layer containing hydrated alumina and polyvinyl alcohol as principal components was formed on this support. Thus, a recording medium was produced which includes a void type ink receiving layer and has a surface pH after 3 minutes of 5.0 as measured according to the JAPAN TAPPI paper pulp test method No. 49-1.

An image was formed on the obtained recording medium at a 50% recording duty, and the image was air-dried for 24 hours at a temperature of 23° C. and a relative humidity of 55%. The image area of the recorded matter obtained above was measured for optical density (referred to as "optical density before test"). Further, using a super xenon testing machine (Model name: SX-75; manufactured by Suga Test Instruments Co., Ltd.), this recorded matter was exposed for 72 hours at an irradiation intensity of 100 kilolux, a vessel temperature of 24° C. and a relative humidity of 60%. Next, the image area of the recorded matter was measured for optical density (referred to as "optical density after test"). It is noted that the optical density was measured using a spectrophotometer (Spectrolino; manufactured by Gretag Macbeth) under conditions of a light source of D50 and a visual field of 2°. From the resulting values of the before and after optical densities, the residual optical density was calculated based on the following formula to evaluate lightfastness. The evaluation criteria of lightfastness are as described below. The evaluation results are shown in Table 6.

$$\text{Optical Density Residual Ratio } [\%] = \frac{\text{Optical Density After Test}}{\text{Optical Density Before Test}} \times 100$$

AR: Optical density residual ratio of 95% or more
A: Optical density residual ratio of from 90% or more to less than 95%
B: Optical density of from 80% or more to less than 90%
C: Optical density residual ratio of less than 80%

(2) Color Tone

Each of the above-obtained inks was loaded into the ink jet recording apparatus (trade name: PIXUS iP8600) using thermal energy. Recording conditions were set to a temperature of 23° C., a relative humidity of 55%, a recording density of 2,400 dpi×1,200 dpi and an ejection of 2.5 pL. Then, an image was formed on the same recording medium as that described above at a 60% recording duty, and the image was air-dried for 24 hours at a temperature of 23° C. and a relative humidity of 55%. The image area of the recorded matter obtained above was measured for hue angle using a spectrophotometer (Trade name: Spectrolino; manufactured by Gretag Macbeth) to evaluate color tone.

The evaluation criteria for color tone are as described below. The evaluation results are shown in Table 6.
A: Hue angle of from 88° or more to 90° or less
B: Hue angle of from 85° or more to less than 88°, or from more than 90° to 92° or less
C: Hue angle of less than 85°, or more than 92°

(3) Storage Stability

Each of the above-obtained inks was filled in an unused state (empty) BCI-7e ink cartridge (manufactured by Canon), and the ink supply port was shut so that ink inside the ink cartridge would not evaporate. The obtained ink cartridges were placed in a sealed vessel, and stored for 3 months in a thermostatic bath having a temperature of 60° C. Then, the ink cartridges were removed from the thermostatic bath, and loaded into the head cartridge of the ink jet recording apparatus (trade name: PIXUS iP8600). The head cartridge was then removed from the ink jet recording apparatus, and stored for 2 weeks at a temperature of 35° C. and a relative humidity of 10% in a state where the ejection orifice was exposed. The head cartridge was then re-loaded into the ink jet recording apparatus in the same manner as described above. Evaluation of the storage stability of the ink was carried out by sucking for a predetermined number of times and then confirming the recovery properties. Note that "sucking" is the "cleaning of the print head", which is one of the features provided on the above-described ink jet recording apparatus (trade name: PIXUS iP8600).

The evaluation criteria for storage stability are as described below. The evaluation results are shown in Table 6.
A: All ejection orifices recovered to an ejection-capable state without any problems after 4 or less sucks
B: All ejection orifices recovered to an ejection-capable state without any problems after 5 or 6 sucks
C: Some ejection orifices were unable to eject ink even after 6 sucks

TABLE 6

Evaluation Results for Inks of Examples and Comparative Examples

|  |  | Storage Stability | Color Tone | Lightfastness |
|---|---|---|---|---|
| Example | 1 | A | A | A |
|  | 2 | A | A | A |
|  | 3 | AA | A | A |
|  | 4 | AA | A | A |
|  | 5 | AA | A | A |
|  | 6 | A | A | A |
|  | 7 | A | A | A |
|  | 8 | A | A | A |
|  | 9 | B | B | A |
|  | 10 | A | A | A |
|  | 11 | B | A | A |
|  | 12 | A | A | A |
|  | 13 | B | A | A |
|  | 14 | AA | A | A |
|  | 15 | A | A | A |
|  | 16 | AA | A | A |
|  | 17 | A | A | A |
| Comparative Example | 1 | B | C | C |
|  | 2 | B | C | C |
|  | 3 | A | C | C |
|  | 4 | A | C | C |
|  | 5 | A | C | C |
|  | 6 | B | C | A |
|  | 7 | B | C | A |
|  | 8 | B | C | C |
|  | 9 | B | A | C |
|  | 10 | B | C | C |
|  | 11 | B | A | C |
|  | 12 | A | C | C |
|  | 13 | B | A | C |
|  | 14 | A | C | C |
|  | 15 | B | A | C |
|  | 16 | A | C | C |
|  | 17 | B | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-120482, filed May 1, 2007 and 2008-107004, filed Apr. 16, 2008, which are hereby incorporated by reference herein in their entirety.

What is claimed is:

1. An ink jet ink comprising at least two coloring materials of a first coloring material and a second coloring material, wherein the first coloring material being a compound represented by the following general formula (I) and the second coloring material being a coloring material having a pH buffering ability:

General Formula (I)

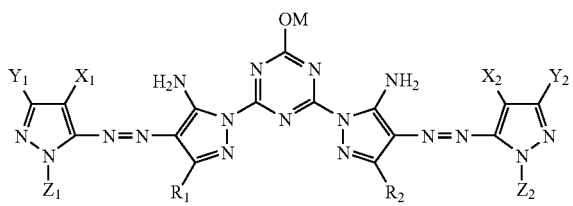

wherein $R_1$, $R_2$, $Y_1$ and $Y_2$ each independently represent a monovalent group; $X_1$ and $X_2$ each independently represent an electron withdrawing group having a Hammett's σp value of 0.20 or more; $Z_1$ and $Z_2$ each independently represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocycle group; and M represents a hydrogen atom, an alkali metal, ammonium or organic ammonium.

2. The ink jet ink according to claim 1, wherein the compound represented by the general formula (I) is a compound represented by the following general formula (II):

General Formula (II)

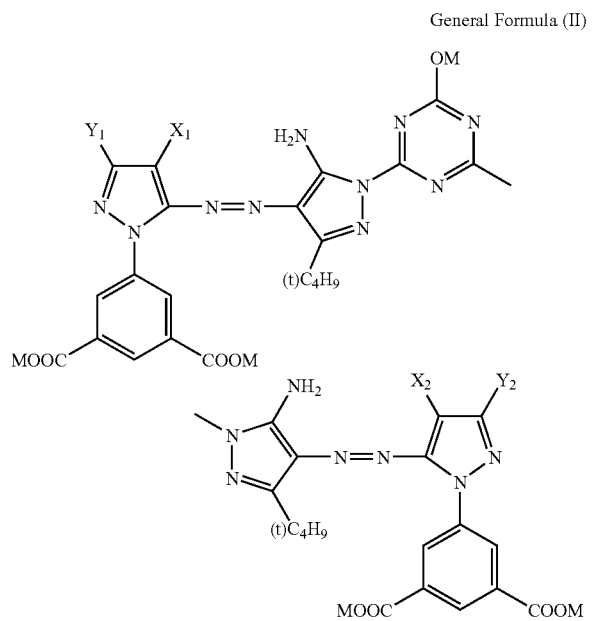

wherein $Y_1$ and $Y_2$ each independently represent a monovalent group; $X_1$ and $X_2$ each independently represent an electron withdrawing group having a Hammett's σp value of 0.20 or more; and each M independently represents a hydrogen atom, an alkali metal, ammonium or organic ammonium.

3. The ink jet ink according to claim 1, wherein the second coloring material is a compound represented by the following general formula (III):

General Formula (III)

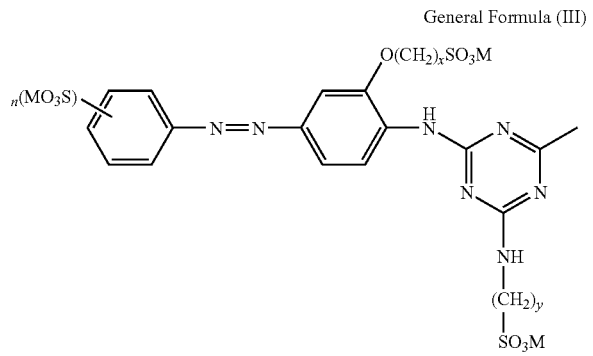

-continued

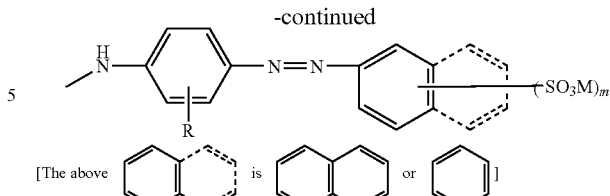

[The above <image> is <image> or <image>]

wherein R represents a hydrogen atom, an alkyl group having 1 to 4 carbon atoms, an alkoxy group having 1 to 4 carbon atoms or a sulfonic acid group; n is an integer of 1 or 2; m is an integer of 1 to 3; x is an integer of 2 to 4; y is an integer of 1 to 3; and each M independently represents a hydrogen atom, an alkali metal, ammonium or organic ammonium.

4. The ink jet ink according to claim 3, wherein the compound represented by the general formula (III) is a compound represented by the following general formula (IV):

General Formula (IV)

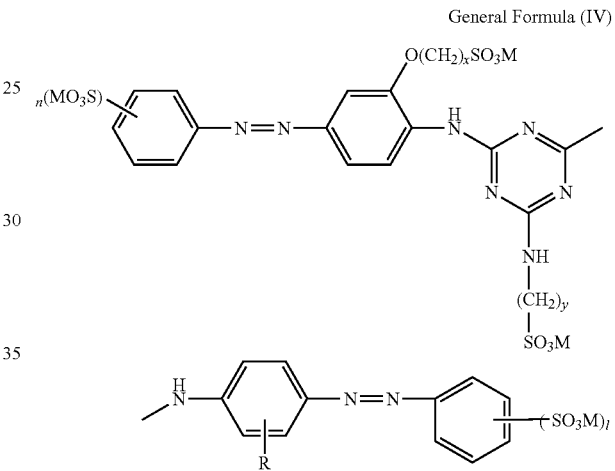

wherein R represents a hydrogen atom, an alkyl group having 1 to 4 carbon atoms, an alkoxy group having 1 to 4 carbon atoms or a sulfonic acid group; n is an integer of 1 or 2; l is an integer of 1 or 2; x is an integer of 2 to 4; and y is an integer of 1 to 3; and each M independently represents a hydrogen atom, an alkali metal, ammonium or organic ammonium.

5. The ink jet ink according to claim 1, wherein the mass ratio of the content (% by mass) of the first coloring material to the content (% by mass) of the second coloring material is from 1.0 time to 5.0 times.

6. An ink jet recording method in which ink is ejected by an ink jet system to perform recording on a recording medium, wherein the ink is an ink jet ink according to claim 1.

7. An ink cartridge provided with an ink storage portion for storing ink, wherein the ink is an ink jet ink according to claim 1.

8. A recording unit provided with an ink storage portion for storing ink and a recording head for ejecting ink, wherein the ink is an ink jet ink according to claim 1.

9. An ink jet recording apparatus provided with an ink storage portion for storing ink and a recording head for ejecting ink, wherein the ink is an ink jet ink according to claim 1.

* * * * *